US005137102A

United States Patent [19]

Houston, Sr. et al.

[11] Patent Number: 5,137,102

[45] Date of Patent: * Aug. 11, 1992

[54] COMBINATION WHEELCHAIR AND WALKER APPARATUS

[75] Inventors: Thomas T. Houston, Sr., Erie; Raymond H. Metzger, Thornton, both of Colo.

[73] Assignee: Retec PR, Inc., Guayama, P.R.

[*] Notice: The portion of the term of this patent subsequent to Feb. 7, 2006 has been disclaimed.

[21] Appl. No.: 305,940

[22] Filed: Feb. 1, 1989

Related U.S. Application Data

[63] Continuation-in-part of Ser. No. 899,890, Aug. 25, 1986, Pat. No. 4,802,542, and a continuation-in-part of Ser. No. 936,078, Nov. 28, 1986, Pat. No. 4,809,804.

[51] Int. Cl.[5] .......................... B60K 1/02; A61G 5/00

[52] U.S. Cl. .................................... 180/65.5; 180/907; 280/304.1; 297/DIG. 10; 297/330; 5/81.1

[58] Field of Search ...................... 180/15, 65.1, 65.5, 180/907; 280/250.1, 304.1, 43.19, 47; 5/81 R; 272/70, 70.3; 297/DIG. 4, DIG. 10, 5, 6, 322, 330, 332, 337

[56] References Cited

U.S. PATENT DOCUMENTS

| | | | |
|---|---|---|---|
| 2,168,424 | 8/1939 | Skinner et al. | 297/6 |
| 3,023,825 | 3/1962 | Rabjohn | 180/15 |
| 3,191,990 | 6/1965 | Rugg et al. | 297/83 |
| 3,872,945 | 3/1975 | Hickman et al. | 180/907 X |
| 3,955,639 | 5/1976 | Cragg | 180/907 X |
| 3,964,786 | 6/1976 | Mashuda | 297/DIG. 10 X |

(List continued on next page.)

FOREIGN PATENT DOCUMENTS

| | | | |
|---|---|---|---|
| 2513499 | 4/1983 | France | 297/DIG. 4 |
| 2545718 | 11/1984 | France . | |
| 0776610 | 11/1980 | U.S.S.R. | 180/907 |
| 1407033 | 9/1975 | United Kingdom | 297/DIG. 10 |
| 2048791 | 12/1980 | United Kingdom | 280/250.1 |
| 2125285 | 3/1984 | United Kingdom | 297/DIG. 4 |
| 8201314 | 4/1982 | World Int. Prop. O. | 297/DIG. 4 |

OTHER PUBLICATIONS

Levo from Amigo Los Angeles, Inc., "Rise to New Challenges".

Exercise and Standing made Easy by Stand Aid of Iowa, Inc., "Standing with Class", Spring 1988.

The New Rehab Chair by Applied Scientific Knowledge, Inc.

"Good News for Paraplegics: The New LEVO Active", Valutec AG.

"Directional Instability of Rear Caster Wheelchairs".

*Primary Examiner*—Andres Kashnikow
*Assistant Examiner*—Brian L. Johnson
*Attorney, Agent, or Firm*—Sheridan, Ross & McIntosh

[57] ABSTRACT

A wheelchair or walker apparatus is disclosed and includes a frame having a base portion and spaced side portions to define a space for receiving an operator's body. A device is provided for supporting the frame above a ground surface for movement therealong and includes a mechanism for moving the apparatus over the ground surface. The movement mechanism includes a device for maintaining contact with a ground surface when moving over uneven terrain. The movement mechanism can be maintained in a preferred alignment. A device is provided to permit an operator within the space to control movement of the apparatus along the ground surface. A seat assembly supports and selectively moves an operator between a seated position and a substantially upright position within the apparatus and permits the operator to control and move the apparatus over the ground surface from both the fully seated position as well as the substantially upright position. Additionally, the seat assembly moves horizontally forwardly and rearwardly to aid in ingress to and egress from the apparatus, as well as upwardly and downwardly to adju~ to the size of the operator. A back support is provided, which in a preferred embodiment, tilts as the operator moves from a seated to a substantially upright position.

18 Claims, 20 Drawing Sheets

U.S. PATENT DOCUMENTS 3,968,991 7/1976 Maclaren ..................... 280/250.1 X
4,053,025 10/1977 Slusarenko ..................... 180/15 X
4,054,319 10/1977 Fogg, Jr. et al. ........ 297/DIG. 4 X
4,067,249 1/1978 Deucher ..................... 297/330
4,076,304 2/1978 Deucher ..................... 297/45
4,190,263 2/1980 Powers ..................... 280/250.1
4,258,815 3/1981 Wier et al. ..................... 180/6.48
4,284,929 8/1981 Garrett et al. ..................... 180/6.5 X
4,341,278 7/1982 Meyer ..................... 180/907 X
4,351,562 9/1982 Twitchell et al. ..................... 180/907 X
4,375,840 3/1983 Campbell ..................... 180/907 X
4,403,673 9/1983 Ball ..................... 180/907 X
4,455,031 6/1984 Hosaka ..................... 180/907 X
4,456,086 6/1984 Wier et al. ..................... 180/907 X
4,462,604 7/1984 Meyer ..................... 280/250.1
4,538,857 9/1985 Engman ..................... 297/437
4,555,121 11/1985 Lockard et al. ..................... 280/304.1 X
4,592,570 6/1986 Nassir ..................... 280/304.1 X
4,598,944 7/1986 Meyer et al. ..................... 297/183
4,613,151 9/1986 Kielczewski ..................... 180/907 X
4,614,246 9/1986 Masse et al. ..................... 297/330 X
4,684,149 8/1987 Meyer ..................... 280/650
4,802,542 2/1989 Houston et al. ..................... 180/907 X
4,809,804 3/1989 Houston et al. ..................... 180/907 X
4,951,766 8/1990 Basedow et al. ..................... 180/907 X

COMBINATION WHEELCHAIR AND WALKER APPARATUS

RELATED APPLICATION

This is a continuation-in-part of U.S. Pat. application Ser. No. 06/899,890, filed Aug. 25, 1986, now U.S. Pat. No. 4,802,542 , issued Feb. 7, 1989 by Tom T. Houston and Raymond H. Metzger, and U.S. Pat. application Ser. No. 06/936,078 filed Nov. 28, 1986, now U.S. Pat. No. 4,809,804, issued Mar. 7, 1989 by Tom T. Houston and Raymond H. Metzger, the contents of both of which are specifically incorporated herein by reference in their entirety.

BACKGROUND OF THE INVENTION

1. Field of the Invention

This invention relates to wheelchair devices and wheeled walker devices for assisting handicapped individuals to move about and, more particularly, to powered wheelchairs and walkers operable by the user or occupant thereof. Specifically, the present invention relates to a wheelchair/walker combination which is adapted to permit the occupant to operate and move the device in a fully sitting position and to rise to an upright position without lower body muscular effort on the part of the handicapped occupant and to also operate and move the device from such an upright position.

2. Description of the Prior Art

Wheelchairs of various types and designs have been utilized for a considerable period of time for the purpose of transporting physically handicapped individuals having limited or no use of their legs, such as paraplegics and quadriplegics. Wheelchair designs have become quite sophisticated as a result of efforts intended to enable handicapped individuals to have a degree of control over their own movements. Thus, powered wheelchairs have incorporated a wide variety of control and safety devices to assist the handicapped operator thereof to achieve relatively independent movement and transportation. A major disadvantage with wheelchairs in general, however, is that such devices, while assisting handicapped individuals in moving about an area, restrict such individuals to a relatively rigid sitting position within the chair which causes continual pressure contact on the same areas of the body. This can lead to serious problems including skin and tissue degeneration, gangrene and the like. In the case of children, lack of weight bearing on the legs can cause growth defects including leg shortness.

Walker devices were designed to overcome some of the aforementioned problems relating to wheelchairs. It has been shown that devices which enable a handicapped individual to remain in a standing position for relatively long periods of time (e.g. 2 or more hours), provide substantial advantages and benefits to handicapped individuals. More specifically, passive standing has been shown to produce beneficial physiological effects which include reduction of bone and calcium loss, reduction of hypercalciuria and urinary calculi, increased muscular tone and maintenance of range of motion, improved orthostatic circulatory regulation, and increased bladder pressure. In addition, substantial psychological benefits result from permitting physically handicapped individuals to remain in a standing position. Such standing positions provide increased independence and morale as well as permit the handicapped individual to position himself so as to be able to work at various working stations. Consequently, walker devices of various types have been developed to permit the handicapped individual to remain in a standing position for periods of at least several hours at a time.

Walkers present a number of problems which are not encountered in wheelchair designs. Such problems arise in part from the fact that a user's body extends substantially above the center of gravity of the walker, thereby leading to the possibility of tipping over. If a walker is designed with a relatively large base area to avoid the tipping problem, maneuverability of the walker is restricted. Additionally, it becomes more difficult to provide support for the user of the walker. Also, movement into a walker is generally much more difficult than transferring to a wheelchair since the user must not only transfer to the device, but must also achieve a standing position, and many users of such devices have no leg control or use whatsoever.

Early walker devices such as illustrated in U.S. Pat. No. 2,168,424 are useful although they have numerous problems and deficiencies. Most particularly is the fact that such early devices require the handicapped operator of the device to utilize his own muscular arm power to maneuver the device about a room or a ground surface area. Thus, the usefulness of the device was dependent entirely on the physical capability and strength of the user.

Powered walker devices were developed which overcame the aforementioned deficiency. Such power devices, as illustrated in U.S. Pat. No. 3,872,945, enable the user to stand within the walker and maneuver and move about an area utilizing a battery power pack or the like carried on the walker itself. This particular patent discloses such a device which enables the user to be highly maneuverable in an area.

Many power walker devices have a rear entryway and carry the power pack and other apparatus up front. These designs limit the distance which the operator of the walker may reach forwardly of the walker and thereby restrict usefulness when working at a table or other work space positioned in front of the walker. Thus, in such arrangements, an operator must preferably position himself sideways to a work area in order to provide close proximity thereto. This sideways orientation to a work area presents certain problems in terms of comfort of and flexibility to the user. The device illustrated in U.S. Pat. No. 3,872,945 overcomes this problem and enables the user to be stationed within the walker apparatus very close to the front thereof, thereby enabling the user to reach beyond the walker a significant distance.

A major problem inherent with all of the aforementioned powered walker designs, including that of U.S. Pat. No. 3,872,945 is that an individual must be assisted into the walker. Moreover, once an individual is positioned within these walkers, they must remain in a standing position. If an individual positioned within the walker wishes to be placed in a seated position, the individual must be entirely removed from the walker. Thus, these designs limit overall usefulness of the walker. Accordingly, there remains a need for a powered walker apparatus which is easy for a handicapped individual to enter and exit unassisted and which enables an operator to move freely from a sitting to a standing position, again unassisted. Furthermore, there remains a need for such a device that will preferably also function as a wheelchair thereby permitting the occupant to move about in a seated position as well and thereby obviate the need for transference between walker and wheelchair.

SUMMARY OF THE INVENTION

Accordingly, it would be advantageous to provide a wheelchair and walker device which enables the occupant thereof to freely and easily move from a sitting to a standing position therewithin without requiring leg muscle use or control and to operate the device from either a fully seated position as a wheelchair or a standing/upright position as a walker.

It would also be advantageous to provide a wheelchair/walker apparatus that is designed to enable the user thereof to easily transfer unassisted to the apparatus in a sitting position.

Additionally, it would be advantageous to provide a powered wheelchair/walker apparatus which is designed to allow the occupant thereof to readily change weight distribution therewithin and without assistance.

Further it would be advantageous to provide a wheelchair/walker apparatus which is easily movable about a ground surface and will not tilt nor lose traction over uneven terrain.

Furthermore, it would be advantageous to provide a powered wheelchair/walker wherein an occupant may easily move to adjacent working areas of varying heights which remain within easy reach of the occupant.

And, it would be advantageous to provide a wheelchair/walker wherein the base and wheels provide stable support for the occupant, yet permit adequate maneuverability in tight spaces.

To achieve the foregoing and other advantages and in accordance with the purpose of the present invention, a wheelchair and walker apparatus is disclosed. The apparatus includes a frame having a base portion and spaced side portions to define a space for receiving an operator's body. A mechanism is provided for supporting the frame above a ground surface for movement therealong and includes a mechanism for moving the apparatus over the ground surface. An arrangement is provided to permit an operator within the space of the apparatus to control movement of the apparatus along the ground surface. Finally, a seat assembly mechanism supports and selectively moves an operator between a seated position and a substantially upright position within the apparatus to permit the operator to control and move the apparatus over the ground surface from both the fully seated and the substantially upright positions.

In an alternate embodiment, a wheelchair and walker apparatus is also disclosed and is arranged to permit an operator to readily move between a seated position and an upright position therewithin. The apparatus includes a frame assembly having a base portion and spaced side portions projecting upwardly from the base portion to define a space therebetween for receiving an operator's body and to further define a front entryway to permit ingress and egress from this space by the operator. A foot support is affixed to the base portion to provide support for the operator when in an upright, standing position within the apparatus. A mechanism is connected to the base portion for supporting the frame assembly above a ground surface for movement therealong. A power source provides power to the frame support and movement mechanism, and a control device interconnects the power source and the movement mechanism to permit the operator to control the movement of the apparatus along the ground surface. A gate arrangement selectively extends across the entryway to provide a closure mechanism when the operator is in the apparatus. Finally, a seat assembly is provided for supporting an operator when in a seated position within the apparatus as well as supporting the operator when in an upright position. The seat assembly includes a seat member and a seat control mechanism for selectively moving the seat member between a substantially horizontal position for carrying the operator in a seated position within the apparatus and a substantially vertical position for supporting the operator when the operator is in an upright position within the apparatus. In a preferred embodiment, the seat is movable between forward and rearward horizontal positions to facilitate ingress and egress from the apparatus and to adjust the center of gravity of the operator and apparatus. Additionally, the seat can be moved between upper and lower positions in order to adjust for the size of the operator.

In a preferred embodiment, the mechanism for moving the walker/wheelchair apparatus over a ground surface includes two front drive wheels. Preferably the two front drive wheels include devices for maintaining the wheels in contact with the ground surface when traveling over uneven terrain. Additionally, a pair of rear casters can include a mechanism for maintaining the rear wheels in a preferred alignment when the chair is traveling in a straight forward direction. In another preferred embodiment, the wheelchair and walker apparatus includes a back support. This back support can be adjustable to the size of the operator and also tiltable relative to a vertical plane as the operator moves between a sitting position and a standing position.

BRIEF DESCRIPTION OF THE DRAWINGS

The features of the present invention which are believed to be novel are set forth with particularity in the appended claims. The invention, together with further advantages thereof, may best be understood by reference to the following description taken in conjunction with the illustrative and presently preferred embodiments as shown in the accompanying drawings in which:

DETAILED DESCRIPTION OF THE PREFERRED EMBODIMENTS

Figure 1:
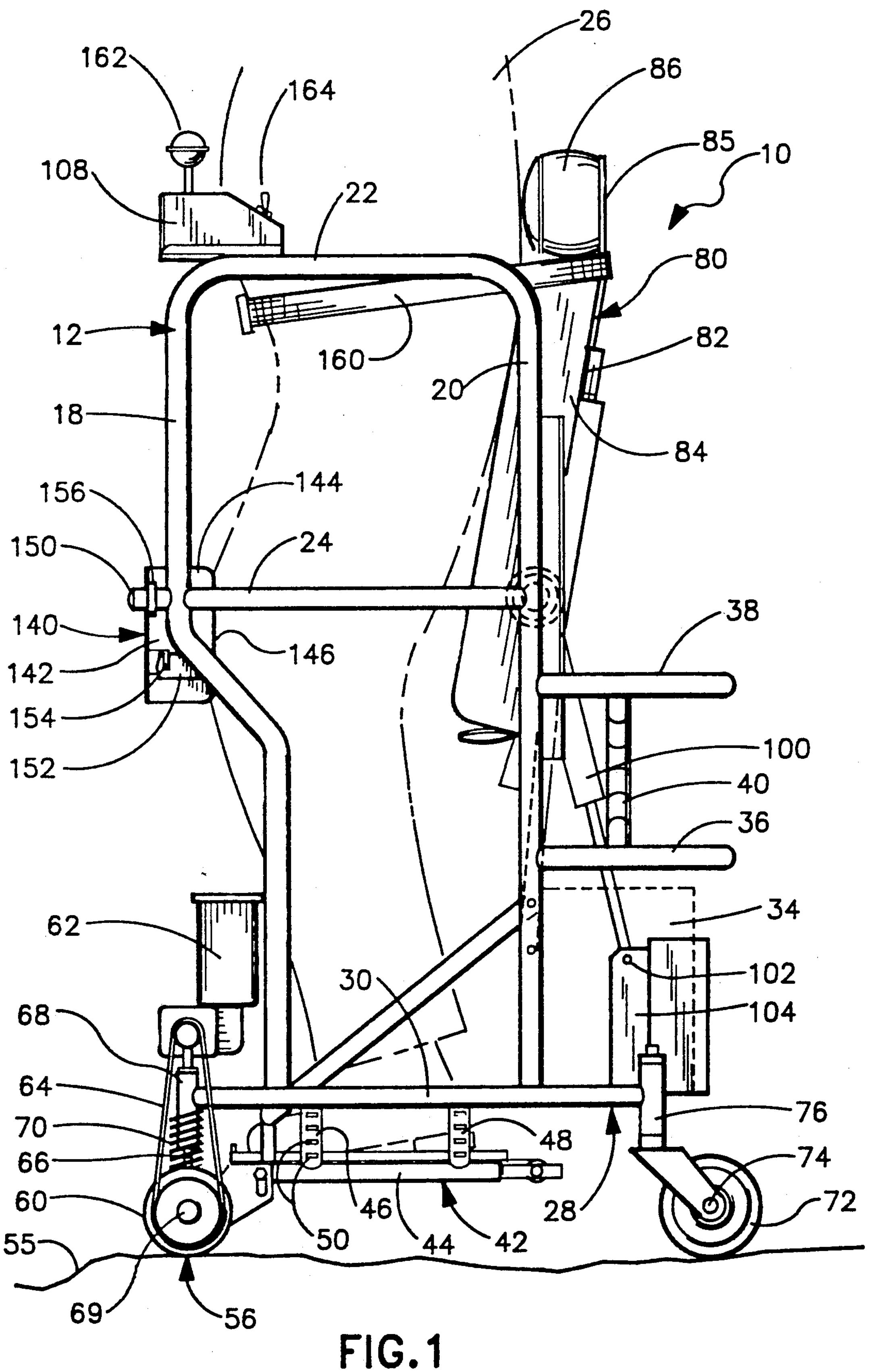
FIG. 1 is a side view of a walker device of the present invention which illustrates an operator in shadow positioned therewithin in a fully upright position.
Figure 3:
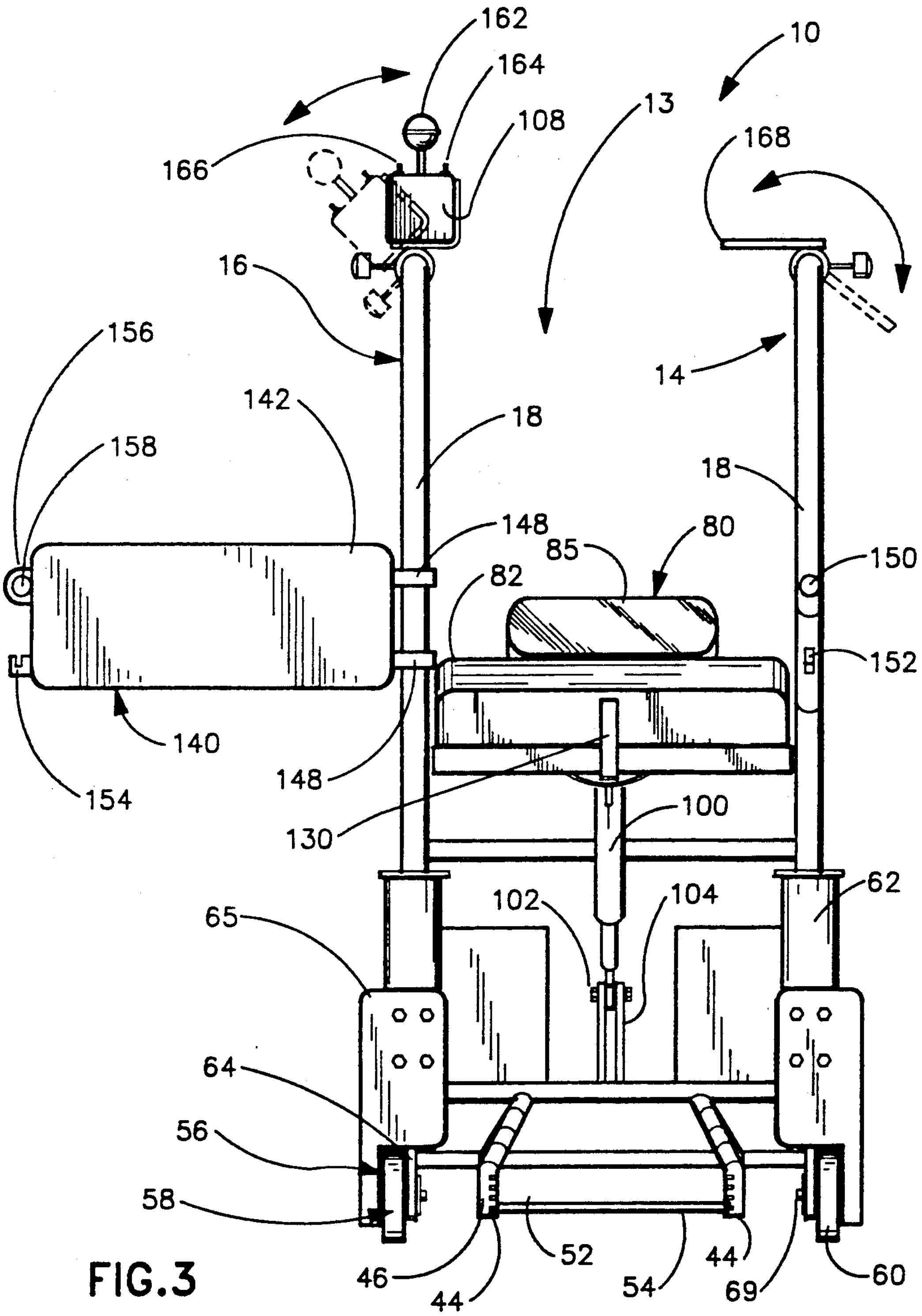
FIG. 3 is a front view of the embodiment illustrated in FIG. 2.
Figure 4:
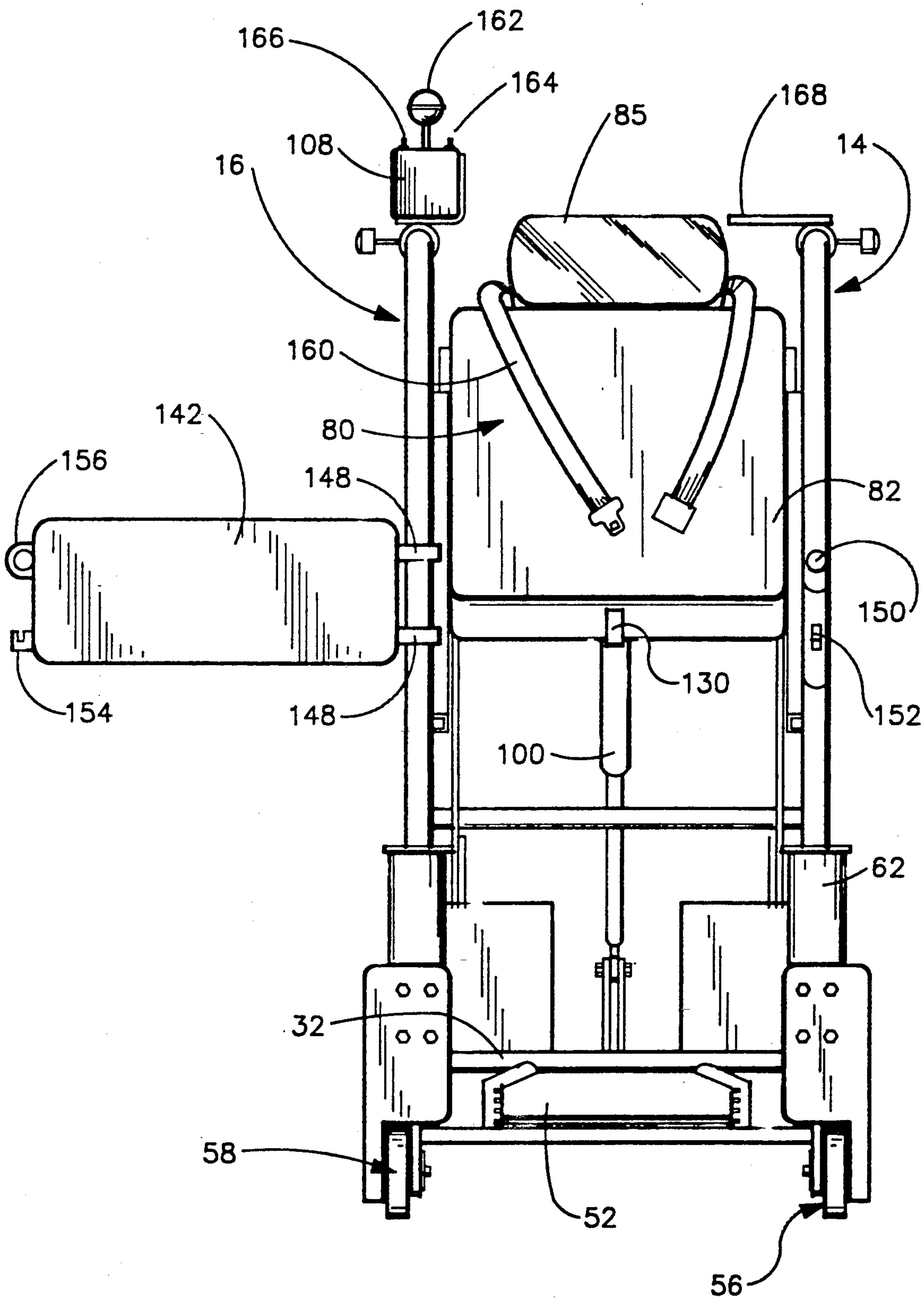
FIG. 4 is a front view of the embodiment illustrated in FIG. 1 with the gate mechanism thereof in a fully open position.

Referring initially to FIGS. 1 and 4, a motorized walker device 10 is illustrated. In preferred form, the walker 10 is motorized and includes a frame assembly 12 having a left side portion 14 and a right side portion 16 defining a front entryway 13 (see FIG. 3). Each of the side portions 14, 16 includes vertical front and rear posts 18, 20, respectively, which are interconnected, as by welding, by vertically spaced-apart side rails 22, 24. The upper side rail 22 functions in part as an arm support member for an operator 26 positioned within the device 10.

A base 28 is provided for carrying the frame assembly 12 in a vertical, upwardly projecting manner therefrom. In preferred form, the base 28 includes a pair of side bar members 30 which are connected, as by welding, to the bottoms of the vertical posts 18, 20 of each side portion 14, 16. The side bars 30 are interconnected by a rear cross bar 32 to form a rectangular-shaped base assembly 28. The rear portion of the base assembly 28 is preferably adapted to carry a power pack 34 which preferably is in the form a rechargeable battery well known in the power wheelchair industry. Power pack 34 provides electric power to the various motor units of the device 10 as described in greater detail below. It is envisioned, however, that other power means including manual arrangements may be utilized to operate the walker 10. Projecting from the rear of the paired rear vertical posts 20 are a pair of generally U-shaped bumper posts 36, 38 interconnected by vertical support members 40. These posts 36, 38 are designed to protect the rear of the device 10 as well as the power pack 34 by projecting from the rear of the device 10. The rigid U-shaped bars 36, 38 also assist in structurally interconnecting the left vertical side portion 14 with the right vertical side portion 16 to provide unitary strength to the frame assembly 12, the terms "left" and "right" being relative to the orientation of an occupant positioned within the device 10. However, the U-shape is also provided to permit easy movement of the seat assembly as described below.

Secured to the base assembly 28 and projecting downwardly therefrom is a foot support mechanism 42. In preferred form, the foot support mechanism 42 includes a pair of base or bottom bars 44 aligned beneath bars 30. Each of the bars 44 includes a pair of upwardly projecting posts 46, 48 secured thereto. Each of the posts 46, 48 are attached at their upper ends to the side bar members 30 and include a plurality of notches 50 which are aligned for receiving a foot tray 52 therein. The plurality of notches 50 are aligned along posts 46, 48 so as to provide a plurality of horizontal planar positions in which the foot tray 52 may be maintained relative to the assembly 42. The tray 52 is vertically adjustable along the posts 46, 48 in accordance with height and comfort of the operator 26.

Figure 2:
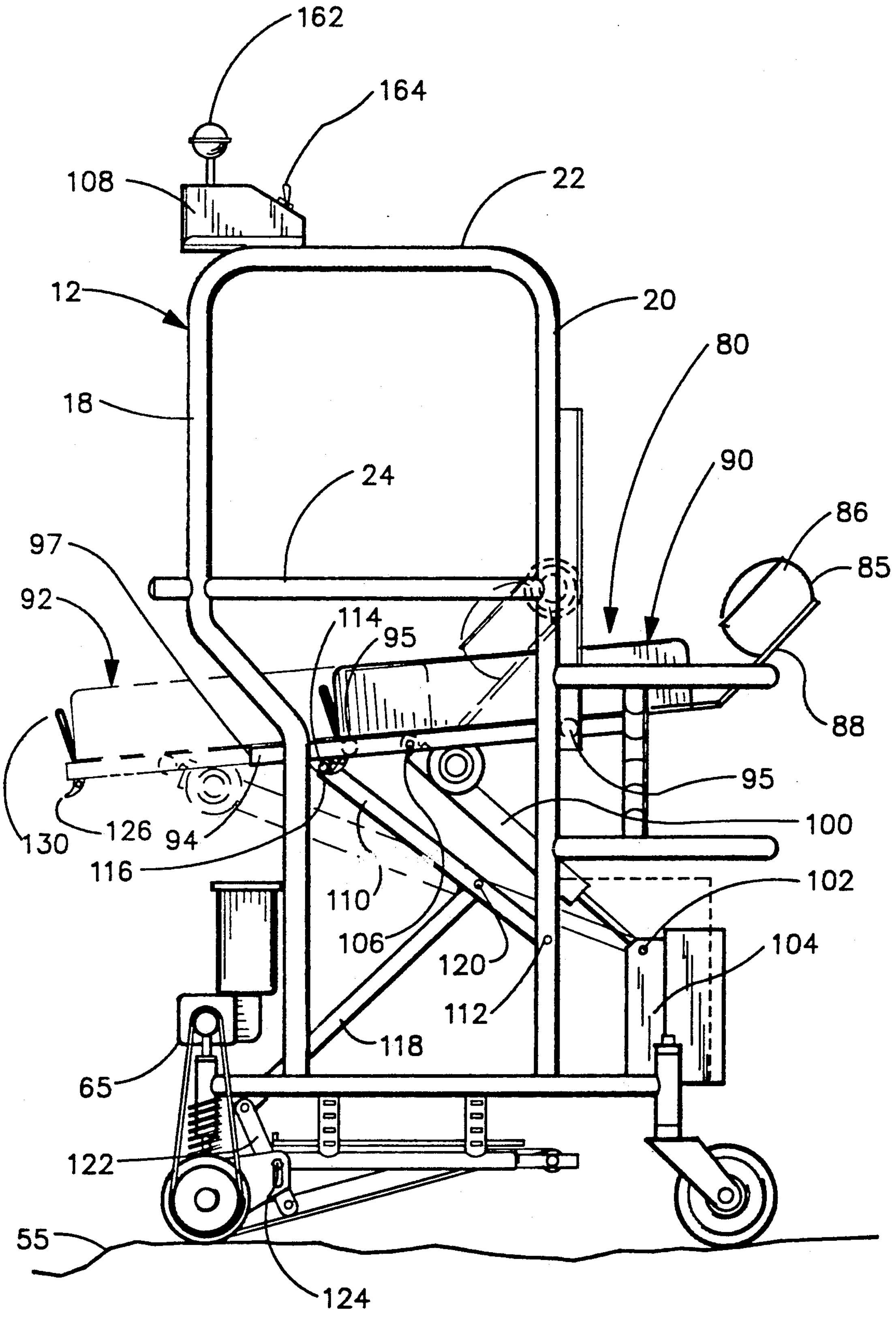
FIG. 2 is a side view of the embodiment similar to FIG. 1 but illustrating the device in a seated position.

In one form of the invention illustrated in FIGS. 1-5, the foot support assembly 42 is interconnected with the seat assembly as described in greater detail below such that when the seat assembly is placed into a horizontal sitting position, a front portion 54 of the foot support assembly 42 is lowered so as to contact the ground surface as illustrated in FIGS. 2 and 3. Thus, in this position, the foot support assembly 42 is inclined or sloped from the ground surface 55 to permit easier access by the user or operator as the operator enters the device 10. Moreover, the front portion 54 may be lowered so as to forcibly contact the ground surface 55 thereby removing some pressure from the front drive wheels as described below and thereby immobilizing or braking the device 10 as a user enters or exits therefrom.

A wheel mechanism is secured to the base portion 28 so as to permit movement and steering of the device 10 over the ground surface 55. In preferred form, a pair of independent drive wheels 56, 58 are positioned at the front end corners of the base assembly 28. Since each of the drive wheels 56, 58 is preferably identical in construction, only one such assembly will be so described. It is to be understood, however, that the description of one drive wheel 56 is applicable to the second drive wheel 58 both in this as well as in later described embodiments.

Referring particularly to FIG. 1, the drive wheel 56 includes a wheel member 60 interconnected to an electric motor 62. In the illustrated form of the invention, a drive chain or belt 64 is utilized to make this interconnection although other means such as direct drive linkage may be utilized. The motor 62 may comprise any available or appropriate drive mechanism and is preferably a standard wheelchair drive motor readily available in the market. The motor 62 moves the wheel 60 forwardly or rearwardly by appropriate rotation of the drive chain 64. A shroud 65 is provided to protect the mechanism of the wheel 56. The wheel 60 is interconnected to the base assembly 28 by a piston-like arrangement wherein the upper end of a connecting pin 66 is positioned for vertical movement within a receiving chamber 68 while connected at its lower end to wheel axle 69. A coiled spring 70 is disposed about the chamber 68 and pin 66 so as to bias or urge the pin 66 vertically outwardly from the chamber 68. However, due to the weight of the device 10, the pin 66 is normally maintained well within the chamber 68 and the spring 70 is maintained in compression. This arrangement remains in this condition so long as the ground surface 55 over which the device 10 is moving is flat. However, in the event that the ground surface 55 is uneven such that the wheel member 60 should come into contact with a dip or hole therein, the spring 70 automatically extends pin 66 so as to maintain the wheel 60 in continuous contact with the ground surface 55 despite the fact that the wheel 60 is in contact with an uneven surface. In preferred form, the amount of travel afforded to the pin 66 within the chamber 68 is approximately 2 ½ inches. Without this arrangement, if one wheel 56 should come into contact with a dip or hole, the wheel 56 could lose its traction with the ground surface 55 while wheel 58 continues to move, thereby causing the device 10 to unexpectedly tilt and/or turn.

A pair of freely rotating wheels 72 are attached to the rear portion of the base assembly 28. Each wheel 72 is mounted for free rotation about an axle 74 as well as mounted by a caster arrangement to a cylinder 76 so as to provide free pivotal movement therein. In this manner, support is provided to the rear of the device 10 to permit easy turning and movement thereof in response to the controlled drive movement of the front wheels 56, 58.

Referring now to FIGS. 1-5, the device 10 includes a seat assembly mechanism 80 which provides the walker embodiment of the present invention with many of its unique characteristics and capabilities. The seat assembly 80 includes a seat member 82 having a cushioned seat portion 84 disposed on the surface thereof. The cushion 84 may be any appropriate material for providing comfort to the user over a prolonged period of time. The seat member 82 is preferably substantially rectangular in shape and extends substantially the entire width of the device 10 between the vertical sides 14, 16. In addition, the seat member 82 includes an outwardly projecting lower back member 85 along the top portion thereof which is adapted for protecting and resting against the small of the back of the operator as illustrated particularly in FIG. 1. The lower back member 85 likewise has a cushion 86 thereon and is secured by a bracket 88 to the upper portion of the seat member 82. The lower back member 85 is adapted to move in conjunction with the movement of the seat member 82 as described below.

As previously indicated, the seat 82 is constructed so as to be able to move from a substantially horizontal position, as illustrated in FIGS. 2 and 3, to a substantially vertical or upright position as illustrated in FIGS. 1 and 4. In the embodiment illustrated in FIGS. 1-5, the term "substantially vertical or upright" is preferably defined to mean up to approximately 10 degrees short of true vertical relative to the horizontal plane of the base assembly 28. Moreover, the seat 82 is constructed so as to be able to move between a first horizontal position 90 located within the frame assembly 12 and a second horizontal position 92 wherein the seat 82 projects forwardly of the frame assembly 12.

Once the seat 82 is in position 92 so as to project forwardly through the entryway of the device 10, the seat 82 is readily accessible from in front of the device 10 so that a handicapped individual may easily transfer from a separate wheelchair or other device to the seat 82 without assistance and without undue effort. Once the individual is fully positioned on seat 82 in its second horizontal position 92, the seat 82 is then moved rearwardly to the position indicated at 90 so as to place the user in a seated position fully within the device 10. Then, as further described below, the occupant may secure certain portions of the device 10 to remain in a seated position or activate the seat 82 so as to move it to its substantially upright position as indicated in FIGS. 1 and 4.

Figure 5:
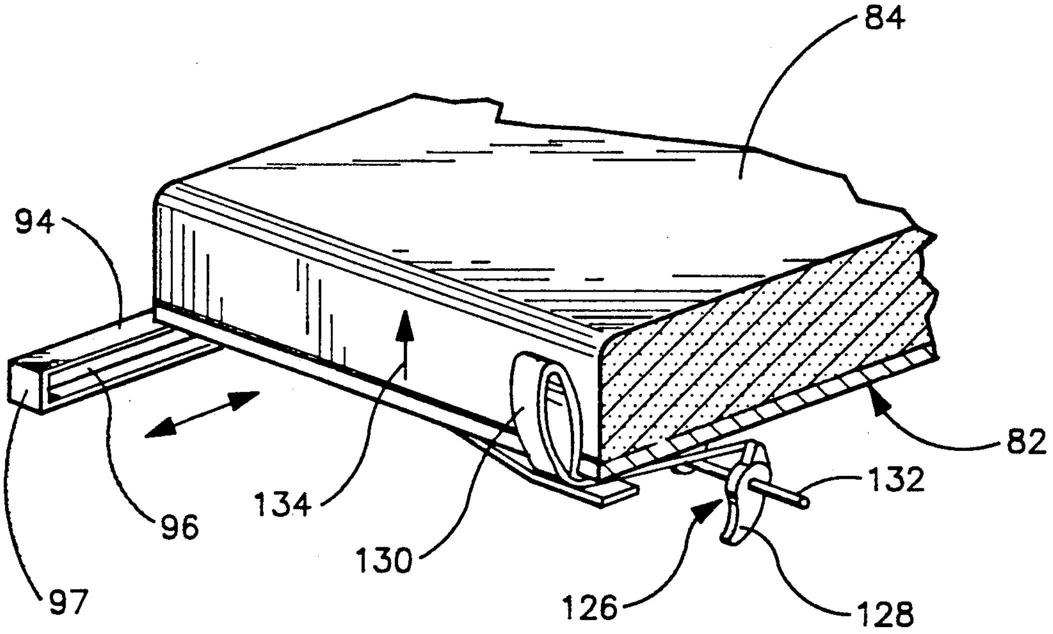
FIG. 5 is a perspective, partially sectional view of one seat construction utilizable with the embodiment of FIGS. 1-4.

To achieve the above seat movements, and with specific reference to FIGS. 2 and 5, the seat 82 is mounted within a pair of slotted brackets 94. The brackets 94 are interconnected crosswise at several locations to form a stable frame structure to hold the seat 82 firmly therewithin. The seat member 82 includes a pair of pins 95 that travel within the groove 96 formed within brackets 94 so as to permit the seat 82 to selectively travel along the length of the brackets 94. Pins 95 limit the movement of the seat 82 relative to the brackets 94 as illustrated in FIGS. 2 and 5. When the pins 95 are at the forward ends 97 of the brackets 94, the seat 82 is in its forwardly extending position 92. Likewise, when the pins 95 are at the rearward portion of the brackets 94, the seat 82 is in its rearward horizontal position 90. Thus, movement of the pins 95 within the brackets 94 enables the seat 82 to move between the horizontal positions 90 and 92 as particularly illustrated in FIG. 2. It should be noted, however, that any seat movement arrangement may be utilized with the present invention so long as it enables the seat 82 to move between the indicated horizontal positions 90, 92.

To move the seat 82 between its two horizontal positions 90, 92, and its substantially vertical position as illustrated in FIGS. 1 and 4, a piston 100 is provided. The lowermost portion of one end of the piston 100 is pivotably connected at point 102 to a bracket 104 which is disposed at the rearward portion of the device 10 along the centerline thereof. The uppermost end of the piston 100 is pivotably connected at point 106 to the bottom portion of the seat 82. Extension and contraction of the piston 100 moves the seat 82 between its various horizontal positions 90, 92 and its vertical, upright position. Movement of the piston 100 is controlled by a control device 108 preferably mounted on the upper member 22 and operated by the user 26, as described in detail below. Power for operating the piston 100 is provided by the power-pack 34.

To assist in proper operation of the seat assembly 80, a pivot arm 110 is disposed on each side of the device 10. The bottom portions of each pivot arm 110 are pivotably mounted at point 112 to the rear vertical posts 20. The upper ends of pivot arms 110 are likewise pivotably mounted at point 114 to a single cross bar 116 which is secured beneath the forward portion of the brackets 94 (see FIG. 2). A second pair of pivot arms 118 are pivotably secured at one end 120 to the midportions of the arms 110 and are pivotably secured at the opposite ends to bottom brackets 122. The brackets 122 are in turn pivotably mounted at point 124 to the foot assembly 42. It is this connection from the seat assembly 80 with the brackets 122 that enables the forward portion of the foot assembly 42 to drop into contact with the ground surface 55 when the seat assembly 80 is moved to its horizontal positions 90, 92. This last aspect of the pivot arm connections, as previously indicated, is optional. In an alternate embodiment (not illustrated) the brackets 122 are eliminated and the brackets 118 connect directly to the assembly 42.

Referring in particular to FIGS. 2 and 5, a latch mechanism 126 is provided along the proximate centerline of the bottom portion of the seat 82. The latch mechanism 126 includes a hook arm 128 which is adapted for selective engagement with the cross bar 116. Likewise, a hand operable pull strap 130 is provided to rotate the hook arm 128 about is mounting bar 132. Thus, the latch assembly 126 is normally arranged so that the hook arm 128 is spring biased to engage the cross bar 116 if the seat 82 is moved from its horizontal position 90 toward its horizontal position 92. The engagement of the hook arm 128 with the cross bar 116 prevents movement of the seat 82 to its position 92. However, should the user desire so to move the seat 82 to its position 92, the strap 130 is pulled upwardly in the direction of arrow 134 to rotate the hook 128 out of engagement with the cross bar 116 and thereby allow the seat 82 to move forwardly to its second horizontal position 92. This interaction of the hook arm 128 with the bar 116 is essential to proper operation of the seat assembly 80.

Referring in particular to FIGS. 1 and 2, operation of seat assembly and movement of the seat 82 from its horizontal position 90 to either its second, forward horizontal position 92 or its vertical position occurs in the manner described below. Should the operator 26 desire to move the seat 82 from its position 90 to its vertically upright position, the piston assembly 100 is activated and extended. This extension of the piston 100 causes latch mechanism 126 to engage the cross bar 116. Since the latch mechanism 126 prevents further forward movement of the seat 82 beyond the bar 116, continued extension of the cylinder 100 forces the seat assembly 80 to lift along pivot points 114 and 106 so as to move the seat assembly 80 to its substantially vertically upright position as illustrated in FIG. 1. To lower the seat assembly 80 from its vertical position to the horizontal position 90, the cylinder assembly 100 is retracted until the seat 82 achieves its position 90.

Should the operator then wish to move the seat 82 from its horizontal position 90 to its second horizontal position 92 to permit entrance or exit from the device 10, the cylinder 100 is again extended. However, at this point the handle 130 is moved upwardly in the direction of arrow 134 so as to disengage the latch mechanism 126 from the cross bar 116. When this disengagement occurs, continued extension of the cylinder 100 will move the seat 82 along the brackets 94 until the seat 82 reaches its fully outwardly extended position 92. Once the latch mechanism 126 has passed over the cross bar 116, handle 130 may be released. To achieve movement of the seat 82 from position 92 to 90, the cylinder 100 is retracted. Since the hook arm 128 is curved as illustrated in FIGS. 2 and 5, movement of the seat 82 from its position 92 back to its first horizontal position 90 will automatically occur without using the strap 130. The curved portion of the hook arm 128 merely pushes across and over the cross bar 116, the spring bias arrangement permitting such rotation of the hook 128.

As soon as an individual 26 wishes to enter the device 10, the seat assembly 80 is activated so as to move the seat to its outwardly projecting horizontal position 92. The operator of the device 10 then transfers onto the seat 82 and retracts the cylinder 100 so as to move the seat 82 to its first horizontal position 90. Once this position is achieved, the operator reverses operation of the cylinder 100 and extends the cylinder 100 until the latch mechanism 126 engages the cross bar 116, at which point the seat 82 moves to its upwardly standing position.

In order that the operator 26 may readily and firmly be maintained within the device 10, a gate mechanism 140 is provided. The gate mechanism 140 includes a gate member 142 having a thick foam padding 144 positioned thereon for engagement with the knees 146 of the operator 26 as indicated in FIG. 1. The gate member 142 is pivotably mounted by brackets 148 to one of the forward vertical posts 18. A ball member 150 and a latch member 152 are mounted on the opposite vertical post 18. Mounted on the free end of the gate 142 is a hook arm 154 for engagement with the latch 152 when the gate 142 is closed across the entryway 13, as clearly illustrated in FIG. 1 and FIG. 3. Likewise, disposed on the free end of gate 142 is a connecting member 156 having an aperture 158 therein which is sized and shaped to receive the ball 150. The ball 150 engages connecting member 156 to provide stability. Should the frame assembly 12 tend to become askew when moving over uneven ground, the connector 154 will not accidentally disengage the latch 152 and the gate 142 will remain closed due to the engagement between the ball 150 and the connector 156. This particular safety feature is important in that knees 146 of the user 26 will be firmly engaged against the inner surface of the gate 142 as illustrated in FIG. 1.

A safety strap or seat belt mechanism 160 is provided to encircle the operator 26. The seat belt 160 is secured to the seat 82 in any desired manner and is of a generally conventional seat belt design as, for example, frequently found in automobiles.

The control mechanism 108 may be of any desired type of mechanism capable of controlling power and operation of the cylinder 100 and the motors 62 for the driven wheels 56. In preferred form, control mechanism 108 includes a single toggle arm 162 which is utilized to control the direction of movement of the device 10. Two switches 164 and 166 are preferably provided. The switch 164 controls the high/low speed for the wheels 56, while the switch 166 will control the lift/drive mechanism for the seat assembly 80 by controlling extension or contraction of the cylinder 100. As illustrated in FIG. 3, the control mechanism 108 may be pivotably mounted to the cross arm 22 so that the control member 108 may be moved away from the operator 26 as desired. Moreover, the control member 108 can be moved to the opposite cross arm 22 depending on whether the operator wishes a left or right hand control. It should also be noted that the control mechanism 108 may comprise a chin control or sip and puff control device in the case of a quadriplegic operator 26. Such devices are presently available in the market for use with power wheelchairs.

For convenience, a writing or utility tray 168 may be pivotably mounted on the opposite arm 22 from the control switch 108. The tray 168 is mounted so that it may be readily pivoted away as indicated in FIG. 3 as desired.

To summarize use and operation of the device 10, the seat 82 preferably projects at least approximately 50% of its depth outwardly beyond the frame assembly 12 when in its position 92. Moreover, the height of the seat 82 above the ground surface in its position 92 is generally approximately the same as a standard wheelchair or other chair height. Therefore, an operator or user 26 may readily transfer from a sitting position in some other device to the seat 82 in its horizontal position 92. At this point, the user 26 may preferably connect the seat belt mechanism 160 about the waist in order to securely and firmly position himself on the seat 82. It should be emphasized that most users or operators 26 will have absolutely no use or control of their leg muscles. Thus, the present invention is specifically designed and intended for use by such individuals without outside assistance. Once the seat belt mechanism 160 is so attached, toggle switch 166 is activated to retract the cylinder 100 and move the seat 82 to its inner or first horizontal position 90. Once this position 90 is achieved, the gate 142 is closed so as to engage the connector 154 with the latch 152 and the ball 150 within the connector 156. The frame assembly 12 is sized and shaped so that the operator 26 may be in a fully sitting position with seat 82 in its position 90 and the gate mechanism 140 in either its closed or open position.

At this juncture, the operator 26 may then move himself to a standing position without utilizing or requiring any muscle control of his legs by engaging the switch 166 and extending the piston 100. As the piston 100 extends and the latch mechanism 126 engages the cross bar 116, the seat 82 gradually lifts upwardly to its substantially vertical position as indicated in FIGS. 1 and 4. In this maximum upright position, the seat 82 is preferably approximately 10 degrees off vertical. As the seat 82 moves from its horizontal position 92 to its upright position, the knees 146 of the operator 26 engage the inner soft surface of the gate 142. Thus, the contact points wherein the weight of the operator 26 is distributed and leveraged include primarily the operator's knees and buttocks/upper legs with some weight distributed to the feet. Once the operator 26 is in a fully upright position as indicated in FIG. 1, the weight of the operator 26 tends to firmly yet comfortably maintain and wedge the operator 26 in position between the gate 140 and the seat 82. In this position, the operator 26 may readily operate the high/low speed switch 164 as well as the toggle drive on 162 to easily move the walker 10 along the ground surface 55. Due to the independent drive arrangement of the wheels 56, the walker 10 is very mobile with a short turn radius.

In preferred form, the width of the walker device 10 in its outermost dimensions is approximately 2 feet This enables the operator 26 to readily move through any standard door opening, which is quite unlike standard power wheelchairs or other walker devices presently available. Moreover, not only will the operator 26 sustain the advantages of being in a standing position within the device 10 as described previous hereto, but the operator may readily shift his weight to a wide variety of relative positions between his feet, knees and buttocks/upper legs by moving the seat 82 to any desired position from its fully upright position and its fully horizontal position 90. Moreover, should the operator 26 wish to take a rest from standing he may simply lower the seat 82 to its horizontal position 90 without having to open the gate mechanism 140 or otherwise alter the arrangement of the device 10. This continuous shifting of weight enables the user 26 to increase comfort as well as safety.

In operating the device 10 over a ground surface, the spring loaded independent action of the wheels 56 enables the walker device 10 to remain steady and in firm contact with the ground even when operated over an uneven surface. Moreover, since the weight of the device 10 is carried very low, the low center of gravity keeps the device 10 very stable even though its width dimension is small compared to prior art devices. Additionally, since the only portion of the device 10 immediately directly in front of the operator 26 is the gate mechanism 140, the operator 26 who is in a standing position within the device 10 may move immediately adjacent a work surface, which permits the operator 26 virtually a full arm extension across any work surface. This is unlike prior art devices which carry a great deal of equipment in the front portion of the walker. Such bulkiness in the front of prior art walkers severely limits the arm reach capability of the user of the walker.

Another distinct advantage of the design of the present invention illustrated in FIGS. 1-5 is that since the gate mechanism 140 is the only item positioned between the operator 26 and the front of the device, and since this gate mechanism 140 is disposed very low relative to the operator 26 in a standing position, the operator is psychologically not part of the device 10. Thus, not only does the device 10 enhance access to a working surface, but it also increases the psychological fitness of the operator since he is not confronted with a bulky machine immediately in front of him which limits his access to a working surface. It should also be noted that, as previously described, since the weight distribution of the device 10 is low and to the rear, there is very little danger of the device 10 tipping forwardly even though there is very little in the way of machine immediately forward of the operator in an upright position within the device 10.

Referring now to the embodiment illustrated in FIGS. 6-12, a wheelchair 200 is illustrated which has the capability of functioning both as a wheelchair, wherein the operator is capable of moving the apparatus 200 about a ground surface when in a fully seated position, as well as a walker wherein the operator is capable of moving the apparatus 200 about a ground surface when in a fully upright or standing position similar to that illustrated in FIGS. 1-5. It is to be understood that while the embodiment illustrated in FIGS. 6-12 is a preferred power wheelchair/walker arrangement, other embodiments are envisioned within the scope of the present invention such as a manually operable wheelchair combined with a power walker seating arrangement or even a fully manually operable wheelchair/walker embodiment.

In order to fully function as both a power wheelchair device as well as a power walker device, the apparatus 200 incorporates a number of modifications as compared to the walker illustrated in FIGS. 1-5. Specifically, the preferred apparatus 200 includes a frame 202 having a base portion 204 and spaced side portions 206 and 208 which define a space 209 for receiving an operator in a fully seated position. A front entryway is further defined at the forward portion of the frame 202 between the side portions 206, 208. The base portion 204 preferably includes a housing 210 wherein battery packs are housed for providing power to the apparatus 200 as in FIGS. 1-5 as well as common to other power wheelchair assemblies. A foot support tray 212 is provided to firmly engage and contain the feet of the operator when in device 200.

The frame 202 preferably includes a pair of side bar members 214, 216 which are interconnected crosswise by members not illustrated as well as by the tray 212 and housing 210. In addition, each bar 214, 216 includes a vertical front post 218, 220 and a vertical rear post 222, 224, respectively. Each front post 218, 220 is interconnected to its respective rear post 222, 224 at the upper portions thereof by upper side bars 226, 228 respectively. The upper ends of the rear vertical posts 222, 224 are likewise interconnected crosswise by a generally U-shaped bumper post 230 which is designed not only to interconnect the side portions 226, 228 at the rear end of the apparatus 200 but also to act as a bumper guard to protect the inner components of the base portion 204. In addition, the U-shaped bumper post 230 and the upper side bars 226, 228 function as an attachment for a shroud 232 which is adapted to surround the side and rear portions of the base portion 204 to protect the working mechanisms thereof as well as to improve the general overall appearance of the apparatus 200.

Referring particularly to FIGS. 6-12, a pair of drive wheels 234 and 236 are preferably provided at the bottom portion of the front vertical posts 218, 220 respectively. The drive wheels 234, 236 are arranged and assembled similar to the drive wheels 56 of the embodiment illustrated in FIGS. 1-5. In addition, freely rotatable rear wheels 238 are provided at the rear end portion of the bottom side bars 214, 216. The rear wheels 238 are sized and constructed in a manner similar to the freely rotatable castered rear wheels 72 of the embodiment illustrated in FIGS. 1-5. Thus, further details concerning these features will not be repeated and described, for like numbers will indicate like parts and functions. However, wheel shrouds 240 are preferably provided to cover and protect the forward edges of the drive wheels 234, 236. It should be noted that the electric motor 62 provided for each drive wheel 234, 236 can be oriented horizontally as in FIGS. 6-12 or vertically as in FIGS. 1-4 and 19-20. The desired orientation is typically selected to provide the most compact arrangement for the components of base portion 204.

A particular problem encountered with front wheel drive chairs having freely pivotable rear casters is directional instability. Directional stability is generally defined as the ability of a moving vehicle to stabilize its motion against external disturbances. Typically when operated at high speeds or on uneven ground, rear caster wheelchairs are often uncontrollable and may even be considered dangerous. Steering instabilities caused by freely pivotable rear casters must be compensated for in order for the operator to maintain a straight path. Electric wheelchairs that are unstable require much more manipulation of the joystick to maintain a straight path.

In order to overcome the problem of directional instability in a front wheel drive wheelchair, a mechanism is provided for maintaining the rear casters in a preferred alignment. Because a wheelchair typically travels in a straight forward direction most of the time, the preferred alignment direction for the rear casters is for straight forward travel. However, the rear casters must be releasable from this preferred alignment in order to permit the wheelchair to turn.

Figure 24:
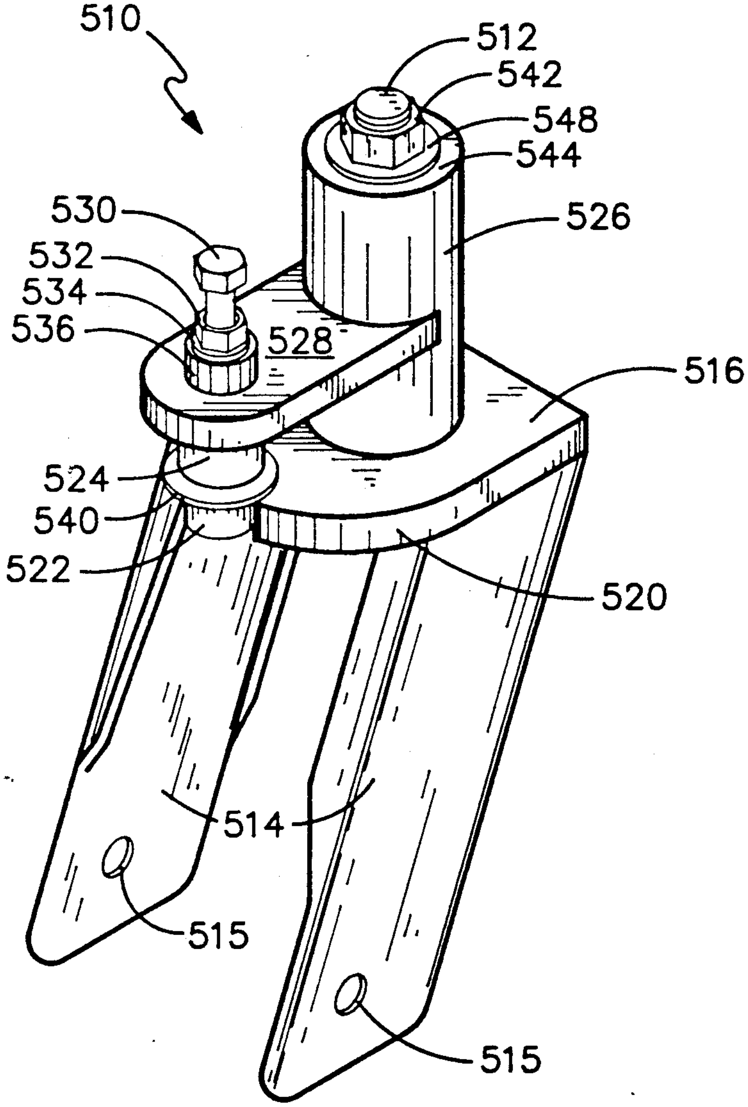
FIG. 24 is a perspective view of a preferred embodiment of a rear wheel caster assembly, including a device for maintaining a rear wheel in a preferred alignment.
Figure 25:
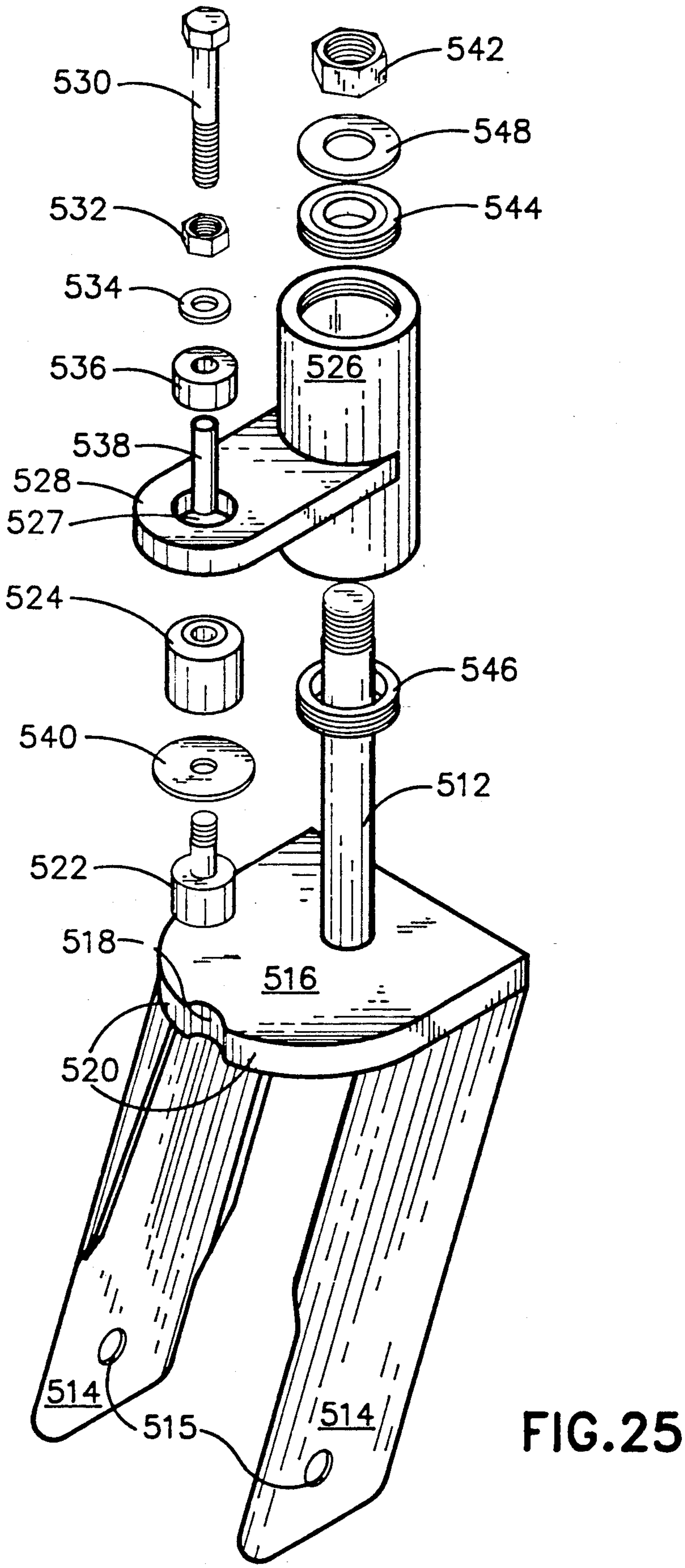
FIG. 25 is an exploded view of the embodiment illustrated in FIG. 24.

An embodiment of a device for selectively maintaining a caster in a preferred alignment is shown in FIGS. 24 and 25. The device 510 comprises a pivotable vertical member for rotatably supporting a wheel and a pivotable plate joined to the vertical member so that they pivot concurrently. For example, as shown in FIG. 25, the pivotable vertical member and pivotable plate comprise a caster fork shank 512, a wheel fork 514 and a horizontal plate 516. The horizontal plate 516 includes a notch portion 518 and a ramped edge 520 adjacent each side of the notch 518. The ramped edge 520 is in the shape of a portion of an ellipse, with the major axis of the ellipse passing through the notch portion 518. An engagement device is biased for selective engagement with the notch 518.

As illustrated in FIG. 25, the engagement device can be a needle bearing roller 522 which can roll across the ramped edge 520 of the horizontal plate 516. When the needle bearing roller 522 engages the notch 518, a rubber collar 524 biases the needle bearing roller 522 into the notch 518. In this manner, the caster 510 will remain in the alignment wherein the needle bearing roller 522 engages the notch 518 until a turning force sufficient to disengage the needle bearing roller 522 from the notch 518 is applied. This turning force must be great enough to overcome the bias applied by the rubber collar 524. The bias force applied by the rubber collar 524 may be increased by compressing the collar 524. In other words, when bolt 530 is tightened, a compressive force is applied against the rubber collar 524 thereby increasing its bias force. Alternatively, the bias force can be reduced by loosening bolt 530 and partially relieving the compression on the rubber collar 524.

The needle bearing roller 522 and rubber collar 524 are attached to the caster fork housing 526 by way of bracket 528. The attachment can be achieved by any means known to those skilled in the art. As illustrated in FIG. 25, the attachment of the needle bearing roller 522 and rubber collar 524 through an aperture 527 in the bracket 528 can be accomplished through the use of a bolt 530, nut 532, first washer 534, spacer 536, collar 538, and second washer 540. The collar 538 has interior threads to receive the threaded portions of roller 522 and bolt 530. The caster fork shank 512 is pivotably received in the caster fork housing 526 employing means well known in the art. For example, the shank 512 can be pivotably received in upper bearing 544 and lowering bearing 546 which fit within the interior of housing 526. Shank 512 can be secured by nut 542 and washer 548. FIG. 24 illustrates the rear caster in assembled form.

In use, a wheel (not shown) is rotatably supported on an axle (not shown) which passes through axle holes 515 located in wheel fork 514. The caster fork shank 512 is pivotably supported by upper and lower bearings 544 and 546 within the caster fork housing 526. When the wheel is in the preferred alignment, e.g. aligned for straight forward travel, an engagement device such as needle bearing roller 522 engages the notch 518. When a force sufficient to overcome the bias provided by rubber collar 524 is applied to turn the wheel, the needle bearing roller 522 disengages from the notch 518 and the wheel fork 514 is permitted to pivot in order that the wheelchair can turn in the desired direction. Due to the ramped edge 520 adjacent each side of the notch 518, the force required to engage the needle bearing roller 522 in the notch 518 is less than the force required to disengage same. If this were not the case, then the needle bearing roller 522 could pop in and out of the notch 518 too easily and would not adequately maintain the caster 510 in the preferred alignment when the wheelchair was traveling in a straight forward direction.

A seat assembly mechanism 242 is provided having a seat member 244 for receiving the buttocks of an operator, and a seat back 246 utilized to support the back portion of an operator disposed within the seat assembly 242. The lowermost end portions of the seat back 246 are preferably pivotably connected to rear brackets 248 which are disposed at the rearmost ends of the seat member 244.

Figure 9:
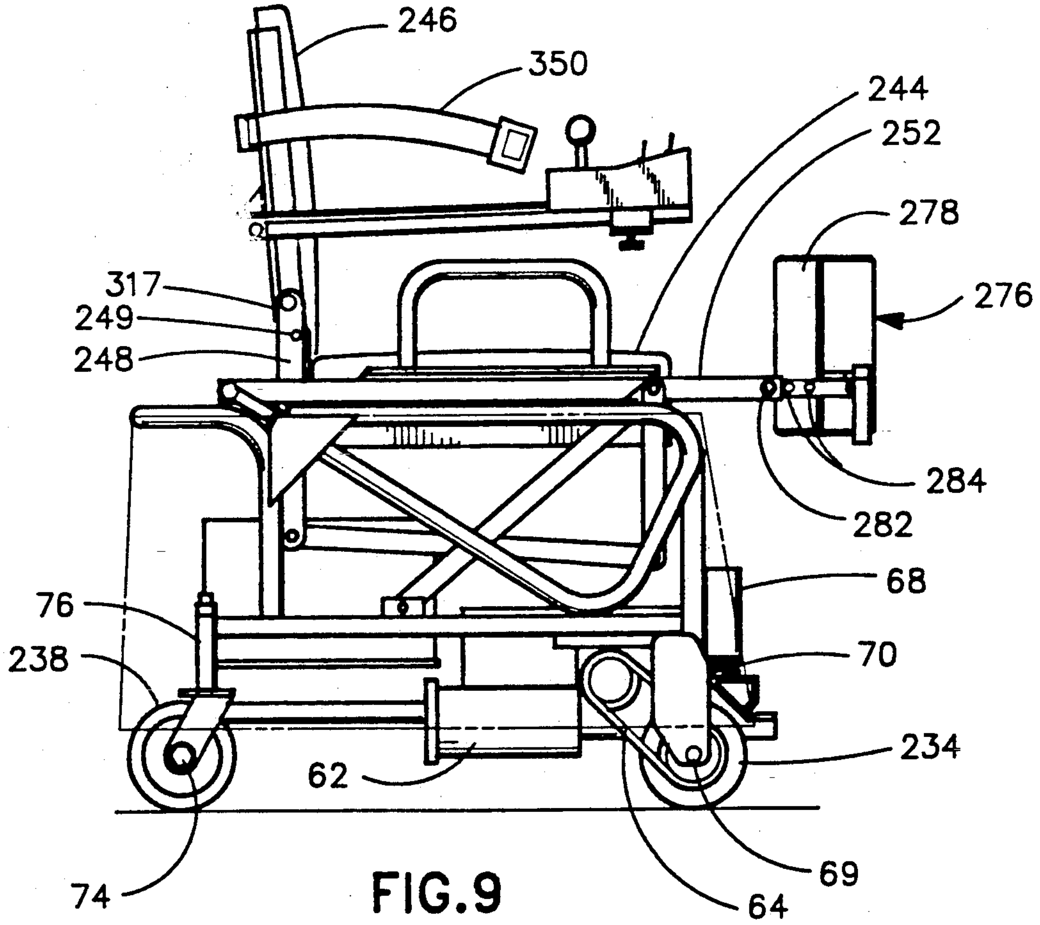
FIG. 9 is a side view of the embodiment of FIG. 8 with the seat back in its unfolded, vertical alignment for use as a wheelchair device.
Figure 10:
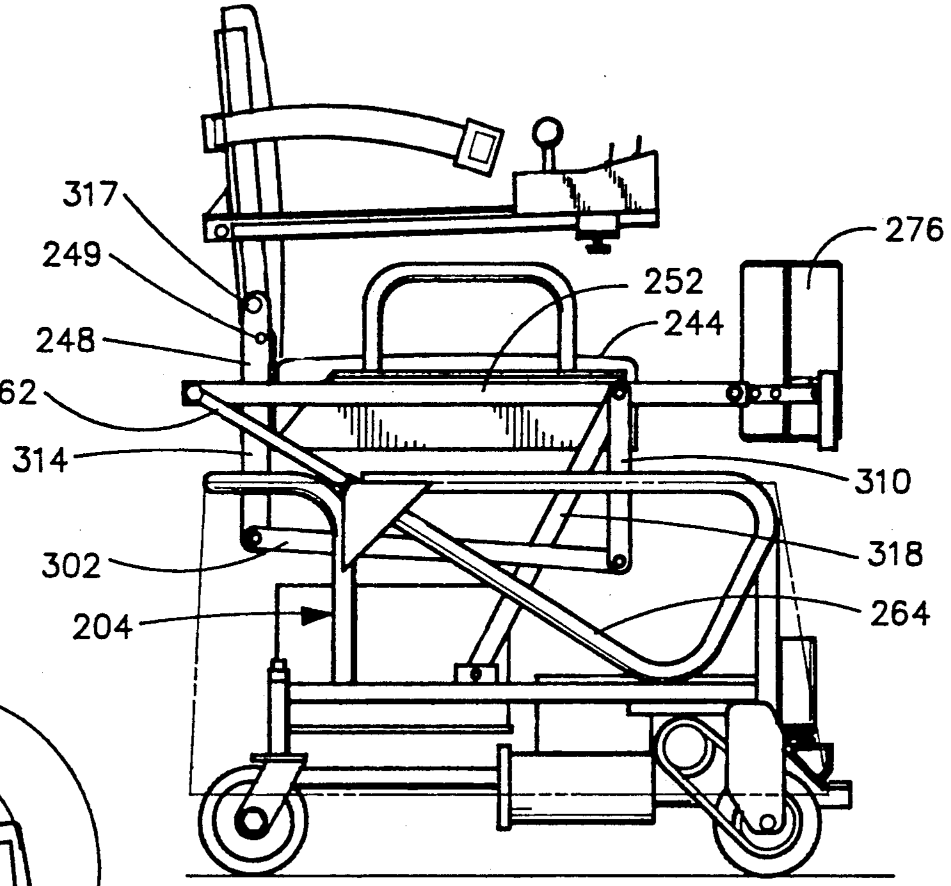
FIG. 10 is a side view of the embodiment illustrated in FIG. 9 and illustrating the seat assembly thereof in a second, raised horizontal position.

A first frame assembly 250 is provided and connected to the seat assembly 242. The first frame assembly 250 includes a mechanism adapted to move the seat assembly 242 in a vertical or upwardly direction while retaining the frame assembly 250 in a substantially horizontal position in order to adjust for the height and size of an operator. This is more clearly illustrated in FIGS. 9 and 10. FIG. 9 illustrates the first and lowermost horizontal position of frame assembly 250 while FIG. 10 illustrates the second and uppermost horizontal position of frame assembly 250. In this instance, the upper or second horizontal position is disposed both vertically upwardly from the first lower horizontal position of FIG. 9 as well as disposed rearwardly relative to the base portion 204 as compared to the first horizontal position of FIG. 9.

To achieve this simultaneous vertical and rearward movement, the first frame assembly 250 includes a pair of side members 252, 254 interconnected along their rear end by a crossbar 256. The forward edge of the seat member 244 is pivotably connected toward the forward end portions of the side members 252, 254 as illustrated using pivot pin 258. The rear end portion of each side member 252, 254 is pivotably connected by a pin 260 to a telescoping rod 262 which is oriented angularly downwardly and forwardly toward the bottom side bar members 214, 216. Each rod 262 is disposed for telescoping movement within a tube 264 which angularly interconnects the rear portion of the upper side bars 226, 228 with the forward portion of the bottom side bar members 214, 216, respectively. Thus, the tube 264 acts as a sleeve for the piston-like movement of the rod 262 as the frame members 252, 254, 256 are moved vertically between the two horizontal positions illustrated in FIGS. 9 and 10. However, due to the angular relationship of the rod 262 and the tube 264 relative to the frame members 252, 254 and 256, as the first frame assembly 250 moves vertically upwardly, the frame assembly 250 is likewise moved rearwardly relative to the base portion 204. Thus, the rod 262 and sleeve 264 act as guides and supports for the first frame assembly 250. It will be appreciated that the angular relationship of the rod 262 and the tube 264 relative to the frame members 252, 254 and 256 can be oriented in various configurations. In this manner, the frame 250 can, move vertically upwardly and simultaneously rearwardly when the angular relationship is as illustrated in FIGS. 9 and 10. Alternatively, if the tube 264 is vertically oriented, the frame 250 can rise vertically upward with no forward or rearward movement. Alternatively, tube 264 can be oriented so that the frame moves forward simultaneously with its vertical upward movement.

Figure 11:
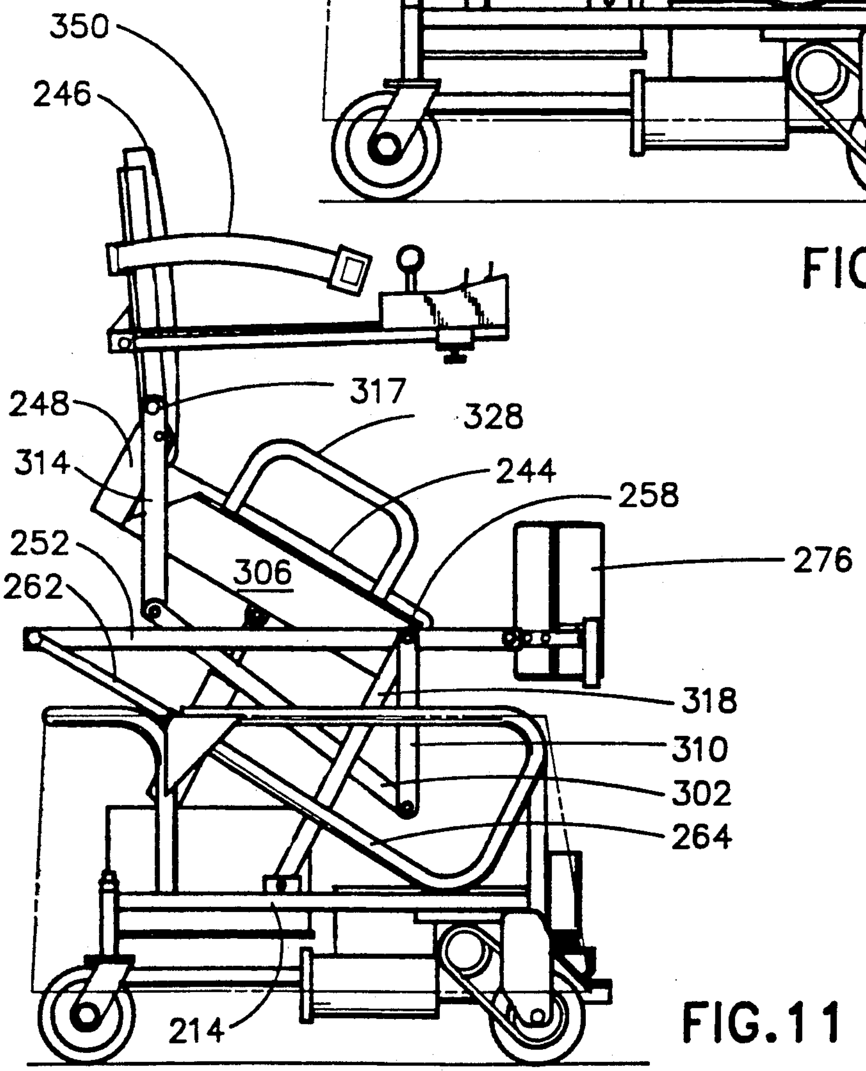
FIG. 11 is a side view of the embodiment illustrated in FIG. 10 illustrating the seat assembly in a partially upstanding position.
Figure 12:
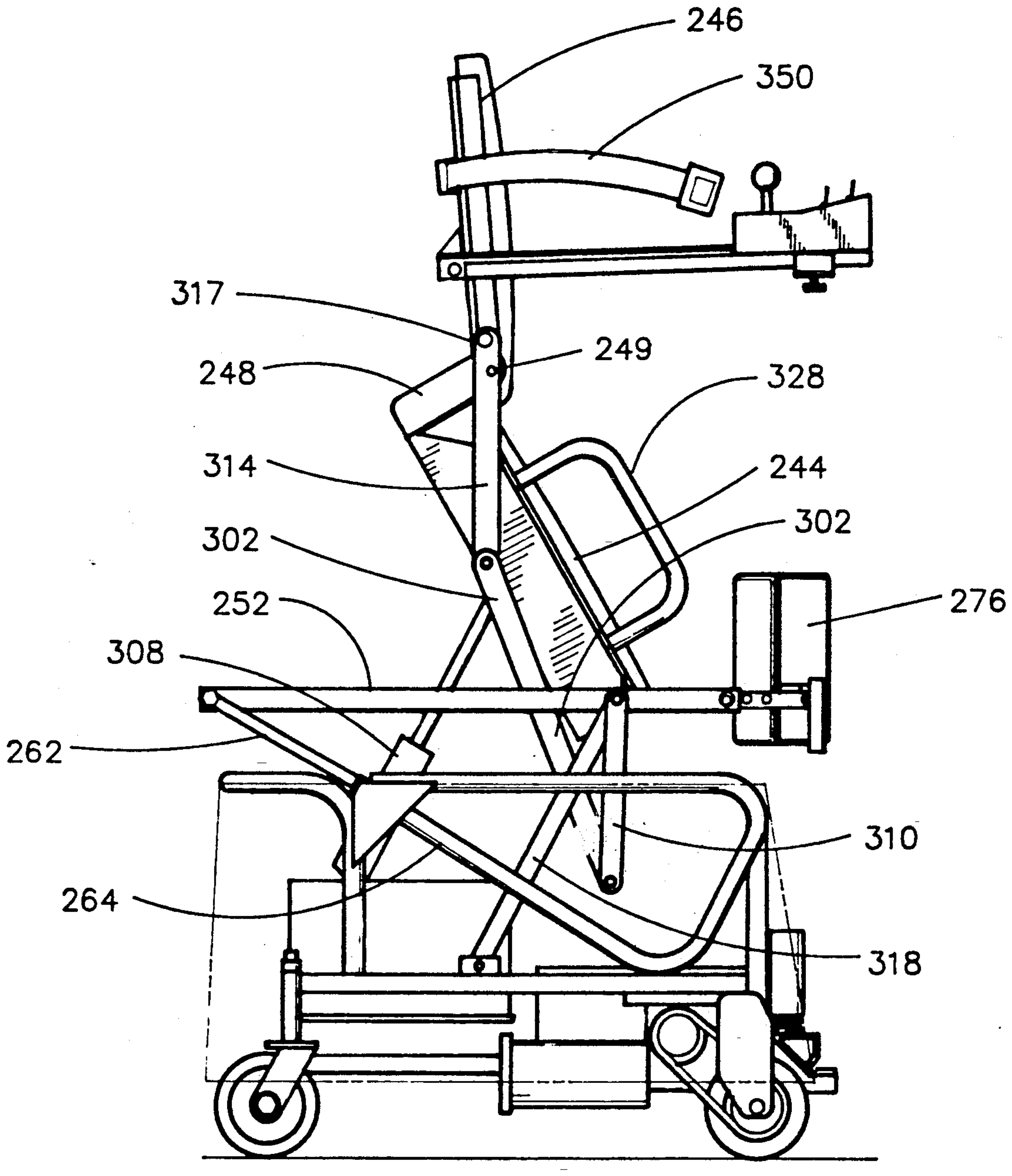
FIG. 12 is a side view similar to that of FIG. 11 but illustrating the embodiment thereof in a fully upright position functioning as a walker.
Figure 13:
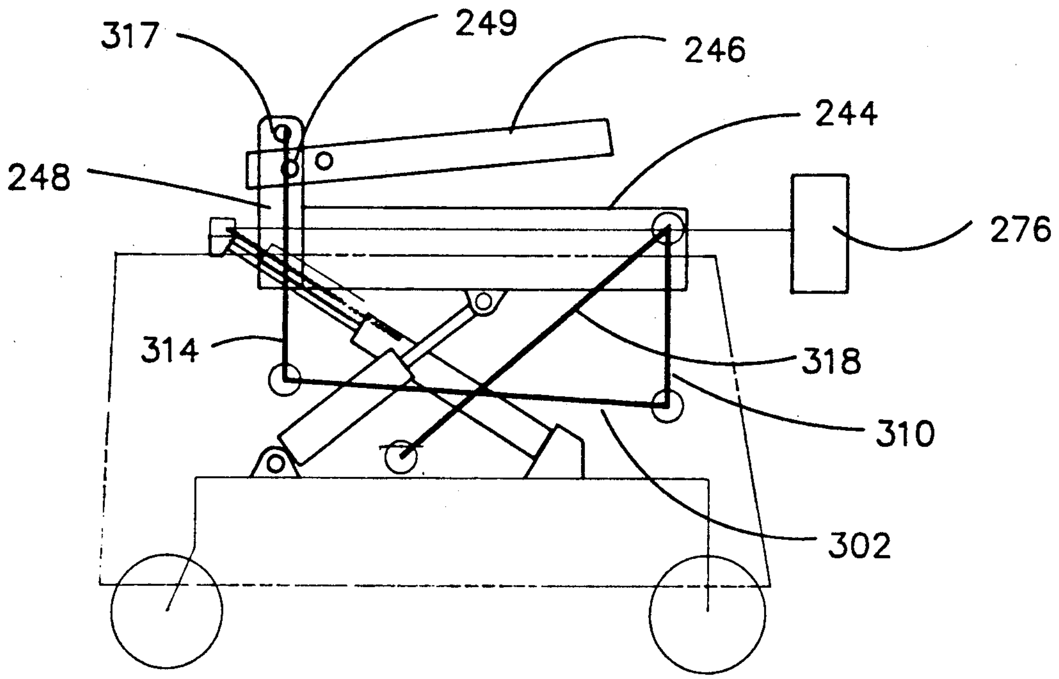
FIG. 13 is a side schematic similar to that of FIG. 8 and illustrating the seat operating components thereof.

As the frame assembly 250 moves between the lower position shown in FIG. 9 and the upper position shown in FIG. 10, the seat assembly 242 can be in any of a number of positions. For example, in FIGS. 9 and 10, the seat assembly 242 remains in a sitting position as the frame assembly 250 moves between upper and lower horizontal positions. However, as illustrated in FIG. 11, the seat assembly can also be in a partially raised position when the frame assembly 250 is in the upper position. Alternatively, the seat assembly 242 can be in a fully raised position when the frame assembly 250 is in an upper position, as illustrated in FIG. 12. In addition to the positions illustrated in FIGS. 9 through 12, the seat assembly can be in any position between the fully seated position and the fully upright position when the frame assembly 250 is in any position between the lower and upper positions. If desired, the frame assembly 250 and the seat assembly 242 can be moved simultaneously.

Movement of the first frame assembly 250 is controlled by a first control piston 266 which interconnects the center portion of the rear crossbar 256 with the base portion 204. Movement of the piston 266 is preferably controlled by the power mechanism disposed within the housing 210 as well as the control lever mechanisms 342 and 348 as more particularly described below.

In one embodiment of the present invention, the angular relationship of the piston 266 relative to the plane defined by the bottom side bar members 214, 216 is the same as the angular relationship of the rod 262 and sleeve 264 relative to the same plane, which angular relationship is variable depending upon the desired amount of rearward or forward movement, if any, relative to the desired upward vertical movement. Thus, movement of the rods 262 within the sleeves 264 is identical to the movement of the piston portion 268 within the piston sleeve 270, with movement of the first frame assembly 250 thereby being controlled by appropriate movement of the first piston 266. In an alternative embodiment, described more fully hereinbelow, the piston 266 is not at the same angle as rod 262 and sleeve 264.

A pair of brackets 272 and 274 project from the forward ends of the frame side members 252, 254 and are disposed for adjustable forward/rearward movement within the frame members 252, 254. A gate member 276 is pivotably mounted to the end of the bracket 272 and includes a thick interior cushion 278 which is arranged for firm yet comfortable engagement against the knees of an operator when the operator is positioned within the apparatus 200. A spring-loaded latch mechanism (not illustrated) of any known and desired design may be utilized at the other end of the gate 276 for engagement with the bracket 274 to firmly position and secure the gate mechanism 276 across the entryway of the apparatus 200. It should be noted, however, that the latch mechanism may be selectively disengaged so as to pivotably swing the gate mechanism 276 away from the entryway allowing easy operator movement into or out of the apparatus 200. Moreover, the hinge connection of the gate 276 with the bracket 272 preferably includes a gate pin member 279 engaged within a bracket socket portion 280 wherein the pin 279 and gate member 276 may be lifted entirely out of engagement with the socket 280 and thereby readily remove the gate mechanism 276 from the entryway entirely. When the pin 279 is engaged within the socket 280, the weight of the gate 276 automatically maintains the gate mechanism 276 in pivotal position as illustrated and desired.

Figure 19:
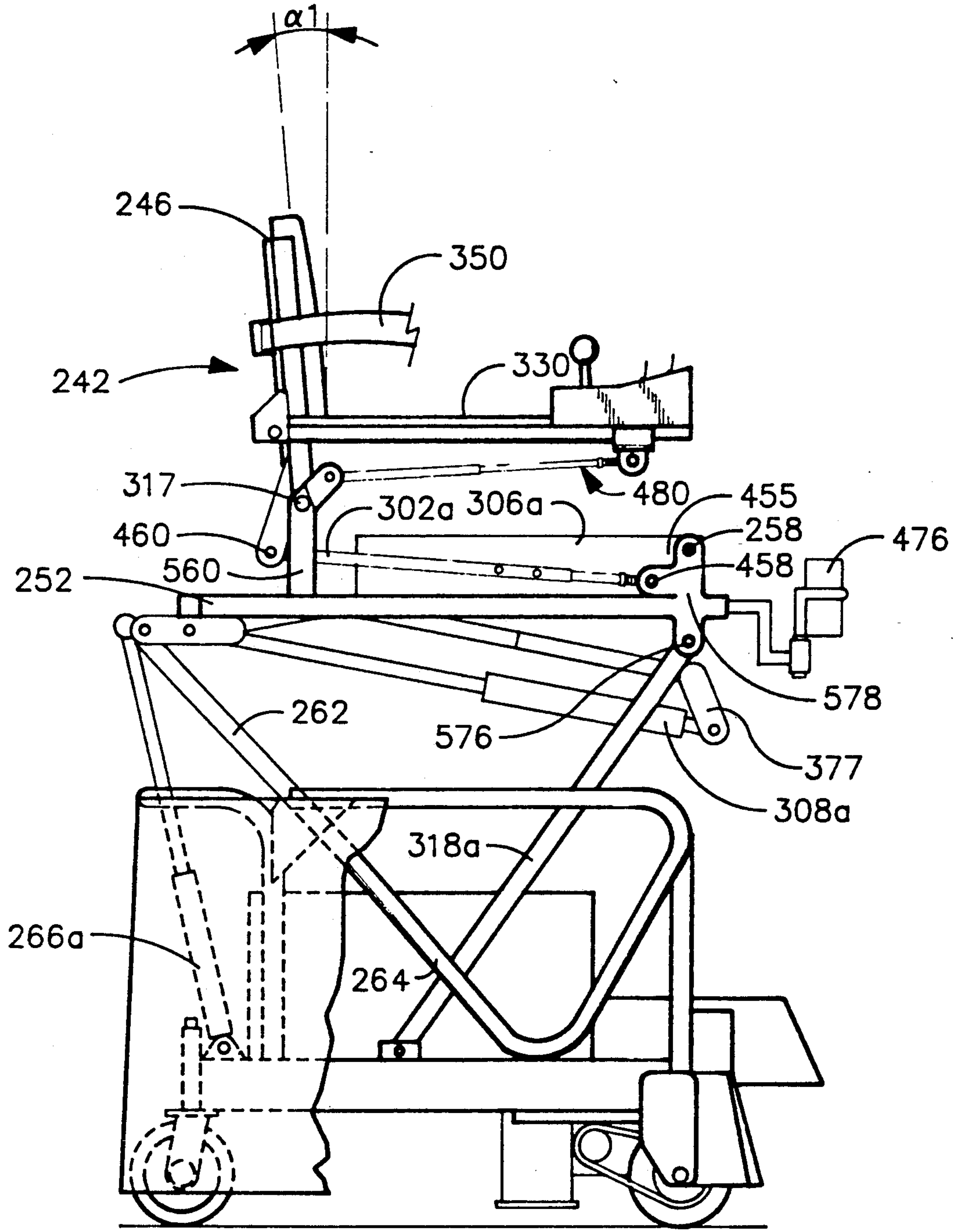
FIG. 19 is a side view of the wheelchair apparatus illustrating an embodiment of the seat operating components.
Figure 20:
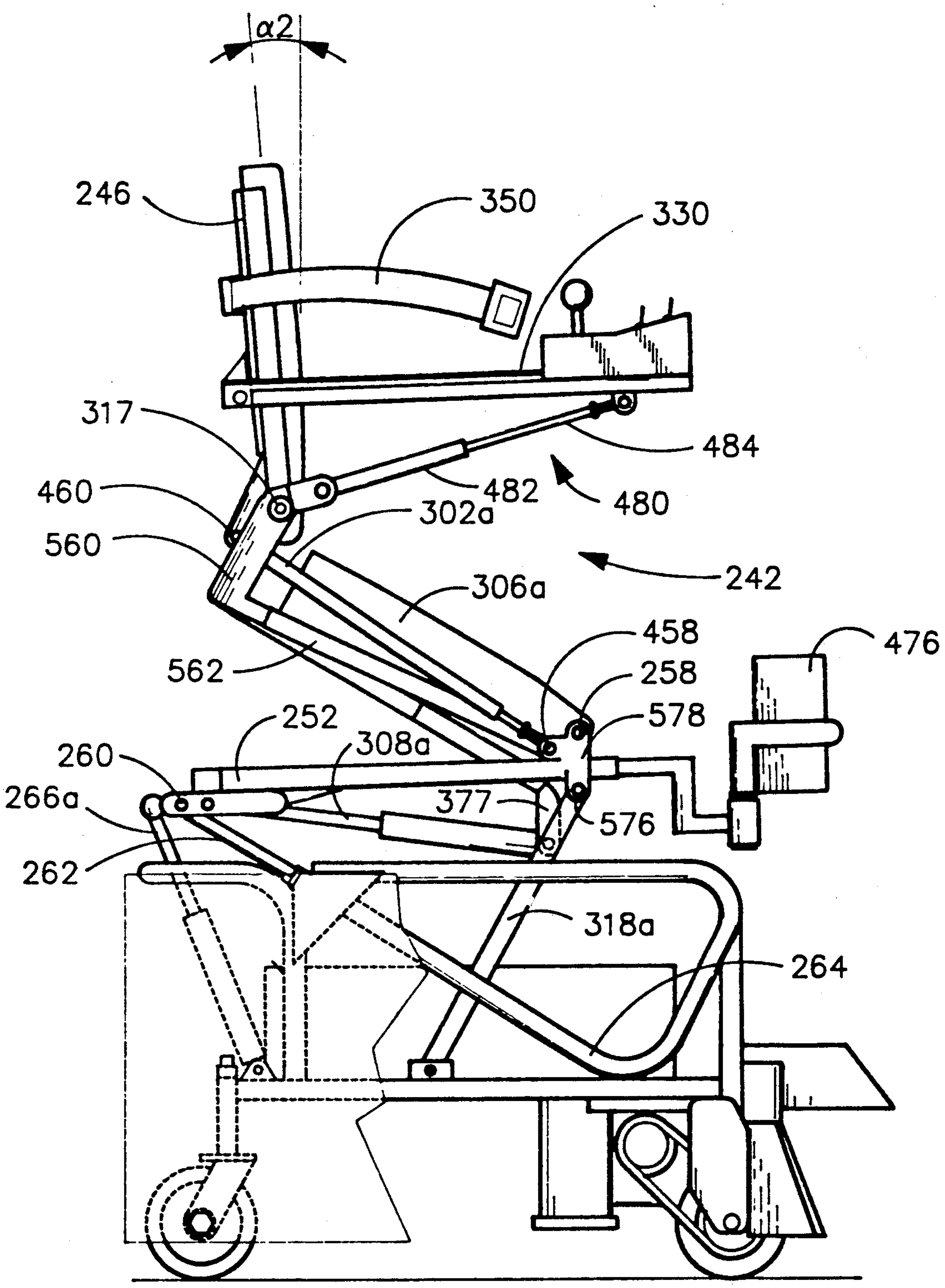
FIG. 20 is a side view of the embodiment shown in FIG. 19 illustrating the seat assembly in a partially upstanding position.

In an alternative embodiment, illustrated in FIGS. 19 and 20, the gate member comprises two separate gates 476, one pivotably attached to bracket 272 and one pivotably attached to bracket 274 (not shown). The ends of both gates 476 opposite to the ends which are pivotably connected to brackets 272, 274 have complementary latch mechanisms. The two separate gates 476 can be swung inwardly and latched together near the center of the entryway to the wheelchair. In this manner, each separate gate 476 forms one-half of the entire gate member, and each separate gate 476 supports one knee of the operator.

As indicated hereinbefore, the brackets 272 and 274 are forwardly and rearwardly adjustable within frame side members 252, 254. To achieve this adjustability, a pin member 282 passes through the side members 252, 254 and may engage any one of a plurality of apertures 284 disposed along each bracket 272, 274, as illustrated in FIG. 9. In this manner, the position of the gate mechanism 276 may be adjusted within the horizontal plane of the first frame assembly 250 so as to adapt the location of the gate mechanism 276 to the size of the operator positioned within the apparatus 200. This adjustment is preferably made so as to insure firm yet not uncomfortably tight engagement of the gate mechanism 276 against the knees of the operator when positioned within the apparatus 200.

Figure 6:
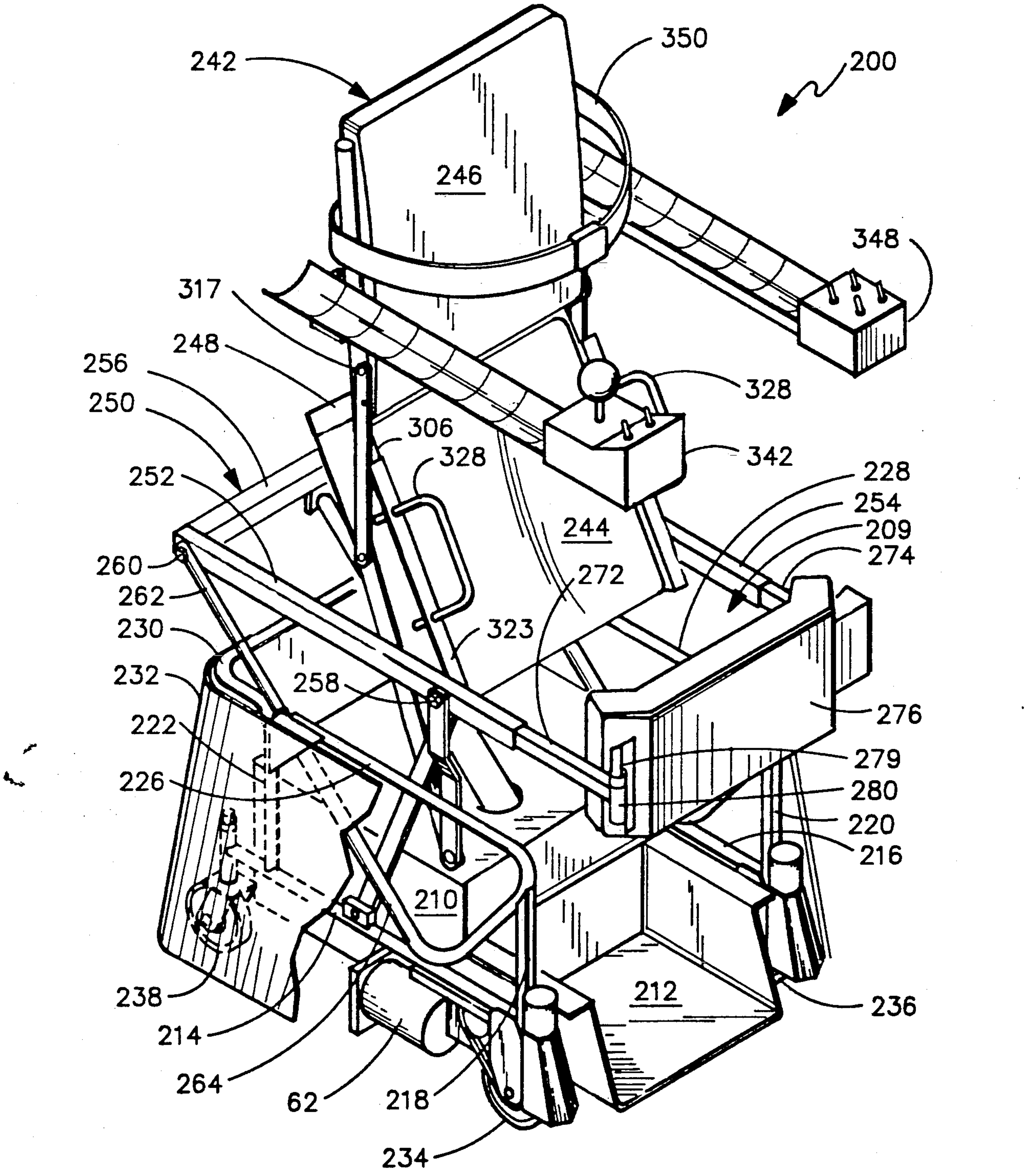
FIG. 6 is a perspective view of a wheelchair/walker combination device of the present invention illustrating the device in a full upright position functioning as a walker.
Figure 7:
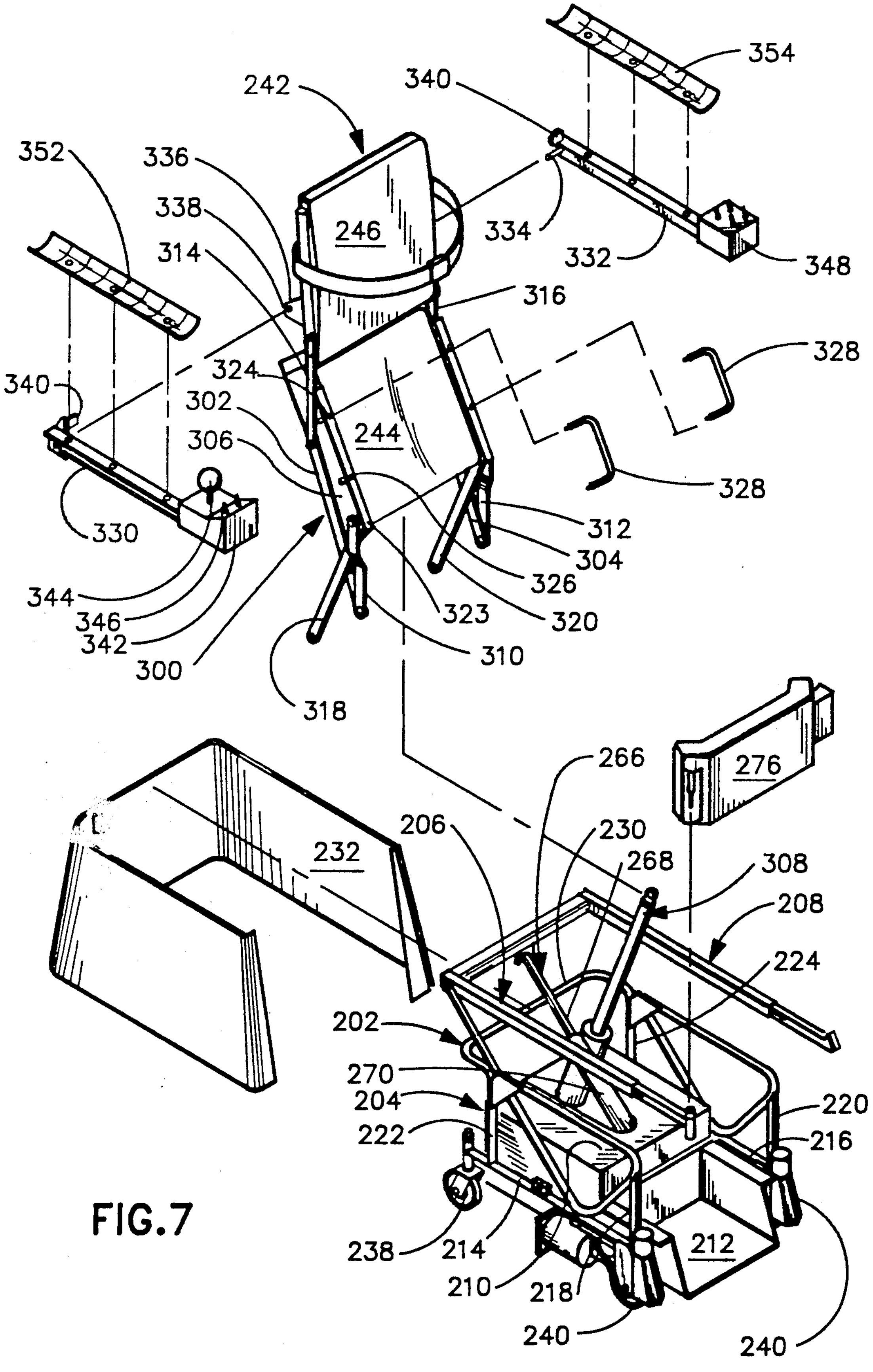
FIG. 7 is an exploded view of the embodiment illustrated in FIG. 6.

Referring now in particular to FIGS. 6 and 7, a second frame assembly 300 is provided and utilized for moving the seat assembly 242 from a horizontal position wherein the operator is in a fully seated position, to a generally upright position so that the operator is maintained in a standing position within the apparatus 200 so that the apparatus 200 may function as a walker device. The frame 300 preferably includes a pair of frame arms 302 and 304 spaced below the seat member 244 and generally parallel with the side edges thereof, although such parallelism may be modified as necessary to obtain the appropriate and desired angulation of the seat assembly 242. In preferred form, the seat member 244 includes side brackets 306 which contain the cushion of the seat 244 and beneath which the frame arms 302, 304 are positioned. As previously indicated, the forward edge of the seat 244 is pivotably secured at pivot pins 258 to the first seat assembly side members 252, 254, and a second piston member 308 is secured proximate the center of the bottom of seat 244. One end of the piston 308 is attached to the bottom of the seat 244 and the other end thereof is attached to the base portion 204 and passes through the housing 210 similar to the first piston 266. The angulation of the second piston member 308 is generally opposite of that of the first piston member 266 so that as the piston member 308 is extended, the piston member 308 raises the seat 244 and pivots it about the pivot pins 258. Thus, as the piston 308 is extended, the seat 244 tilts forwardly from its forward edge.

Figure 18:
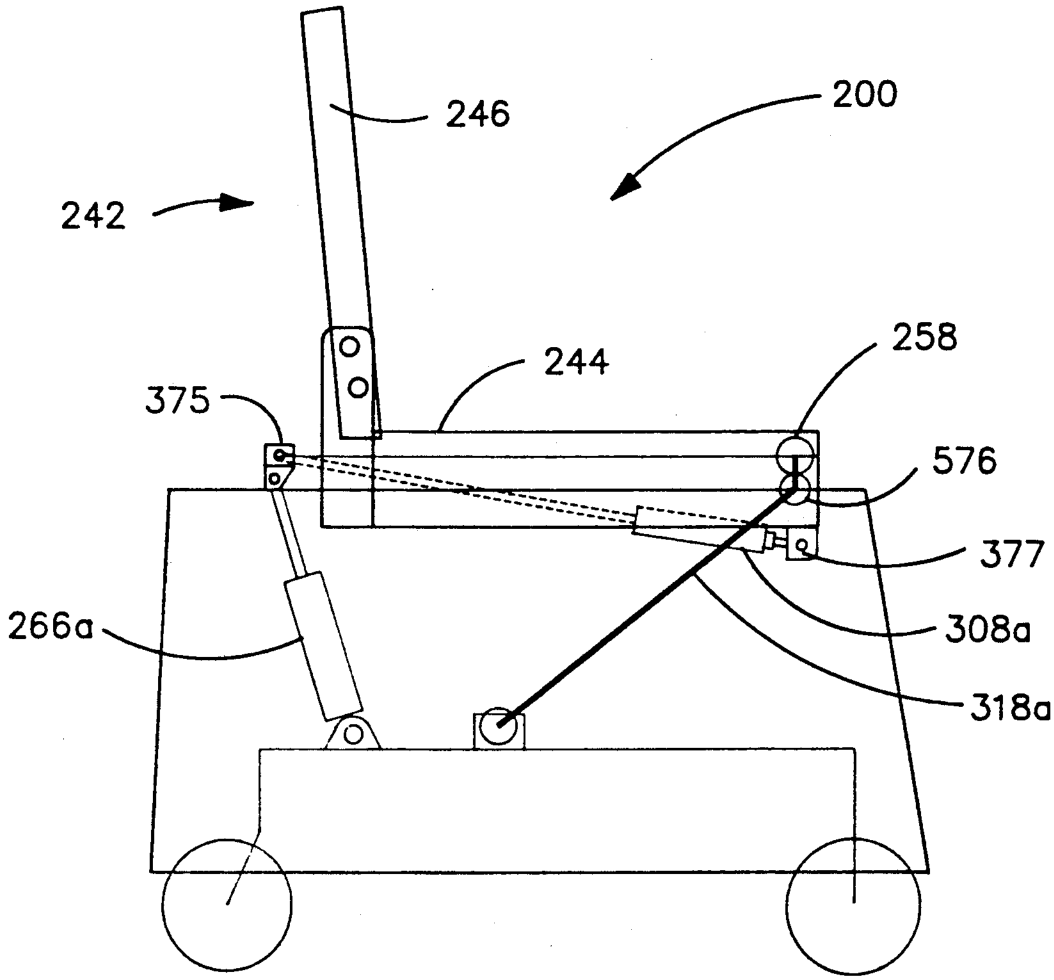
FIG. 18 is a side schematic view of the wheelchair apparatus illustrating another embodiment of the seat operating components.

An alternative embodiment of a mechanism for raising the seat assembly 242 is shown in FIGS. 18-23. As can be seen in FIGS. 18-20, the positions of the two pistons are different from their respective locations shown in FIG. 14. The piston 308 in FIG. 14 used to raise and lower the seat assembly 242 from the seated position to the upright position is alternatively located in the position shown by piston 308a in FIGS. 18-20. The piston 308a is attached at one end to a handle 377 dependent from the central front portion of seat 244 and is attached at the other end to the center of the rear crossbar 256 (not shown) at pivot point 375. The pivotal connection between piston 308a and handle 377 is located below pivot point 258.

In order to raise the seat assembly 242 to a substantially upright position, piston 308a is contracted, thereby pulling the handle 377 in a rearward direction. In this manner, the seat assembly 242 is raised to a substantially upright position. To lower the seat assembly, the piston 308a is expanded, pushing the handle 377 in a forward direction. In this manner, the seat assembly 242 is lowered to a substantially horizontal position as shown in FIG. 19. It will be appreciated that the seat assembly 242 can be selectively moved to any position between a substantially horizontal sitting position and a substantially vertical upright position.

Figure 14:
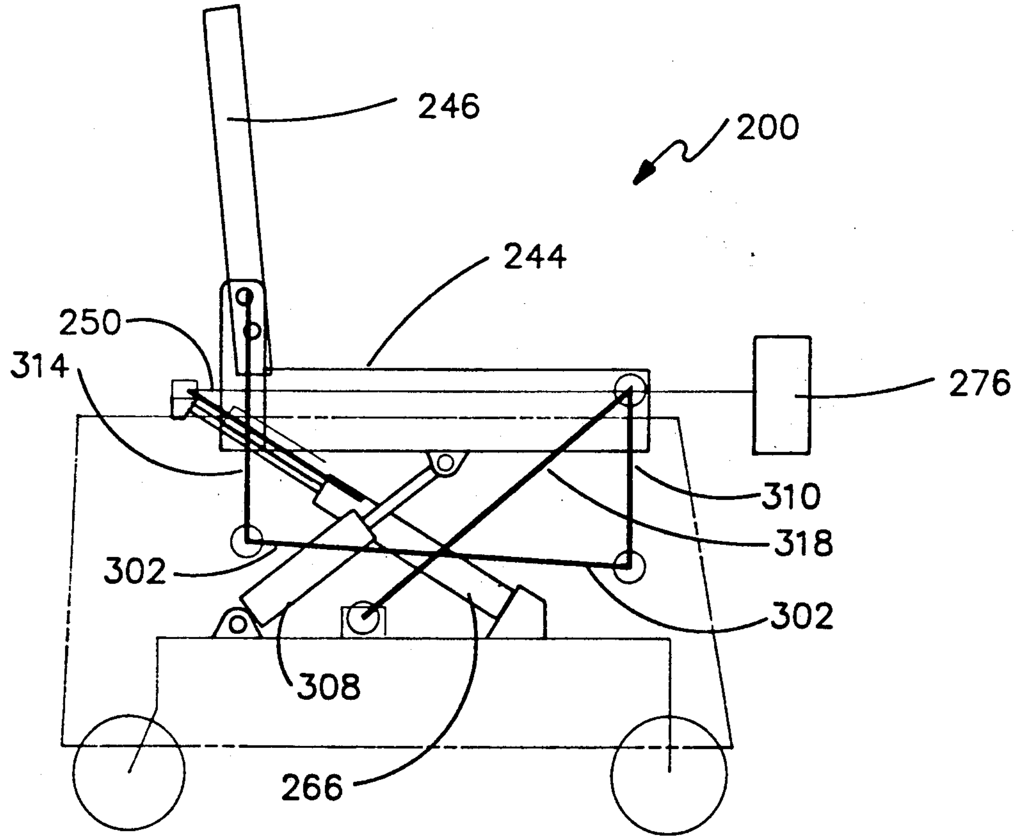
FIG. 14 is a side schematic similar to that of FIG. 9 illustrating the seat operating components thereof.

The arrangement shown in FIGS. 18, 19 and 20 provides a number of advantages. For example, by locating piston 308a in a manner such that one end is attached to frame assembly 250 and the other end is attached to handle 377, more room is provided beneath the seat means 244. Therefore, larger batteries may be employed in order to drive the wheelchair/walker apparatus for longer periods of time. For example, it has been found that group 27 type batteries can be substituted for group 22 type batteries which were employed when the piston 308 was located as illustrated in FIG. 14. The group 27 type battery permits greater operating range for the wheelchair. It is estimated that an electric wheelchair with a group 27 type battery can be operated for 30 miles, as opposed to the 20 to 21 miles in which an electric wheelchair typically operates using a group 22 type battery. Another advantage of positioning piston 308a as illustrated in FIGS. 18, 19 and 20 is that it permits the repositioning of piston 266a. The piston 266a does not have to be located with the same angular relationship as rod 262 and tube 264. The preferred location of piston 266a, as shown in FIGS. 18, 19 and 20 provides better support for frame 250. This better support results from piston 266a being located in a more vertical orientation than piston 266 employed in the embodiment shown in FIG. 14. A more vertical orientation provides greater support for frame 250 as it is raised and lowered. In other words, piston 266a absorbs more downward force than does piston 266, thus relieving some of the weight placed on the tube 264 by rod 262.

A particular problem in the design of stand-up wheelchairs is to insure that the seat back member 246 remains substantially vertical throughout the entire raising and tilting movement of the seat 244 to its fully upright position at approximately 60°-75° from the horizontal as illustrated in FIGS. 6 and 12. As used herein with respect to the seat back member 246, the term "substantially vertical" will include a seat back member 246 having a slight tilt. By "substantially vertical" it is meant that the seat back member can be tilted from 0 to 15 degrees from true vertical. If the seat back member 246 does not remain substantially vertical throughout the seat raising movement, then the shear forces against the back of the operator seated within the apparatus 200 may become unacceptable, and the operator will furthermore not be maintained in an upright orientation. In order to maintain the substantially vertical orientation of the seat back 246 and to minimize or eliminate the shear forces, the second frame assembly 300 includes a pair of first vertically oriented connector rods or brackets 310, 312 which are secured at their uppermost ends to the pivot pins 258 and are secured at their lowermost ends to the forward ends of the frame arms 302, 304. These first vertically oriented connector rods 310, 312 are designed to remain stationary relative to frame arms 302, 304 in a substantially vertical orientation. In addition, a pair of second vertically oriented connected rods or brackets 314, 316 are connected at their lowermost ends to the opposite rearwardly disposed ends of the frame arms 302, 304. The upper ends of the second connector rods 314, 316 are connected by pins 317 to the lower side portions of the seat back member 246. The pins 317 engage the seat back 246 at a position disposed vertically above the pivot point 249 between the seat back 246 and the brackets 248. The second connector rods 314, 316 are also designed to remain substantially vertical in orientation during movement of the seat assembly 242.

Finally, the second frame assembly 300 also includes a pair of brackets 318, 320 which connect at their uppermost ends to the pivot pins 258. The lowermost ends of brackets 318, 320 are pivotably connected to the central portions of the bottom side bar members 214, 216 of the base frame 202. Thus, as the seat member 244 is raised by action of the piston 308 and pivoted about pivot pins 258, a scissors-like movement occurs between the brackets 318, 320 and the frame arms 302, 304, with the frame arms 302, 304 travelling along with the seat member 244. Thus, a parallelogram is generally formed between the seat member 244, the frame arms 302, 304, and the first and second connector rods 310, 312 and 314, 316. It is this interaction between the connector rods 310, 312 and 314, 316 in conjunction with the frame arms 302, 304 and the support brackets 318, 320 which permit the seat back member 246 to remain substantially vertical throughout the entire range of movement of the seat 244.

In an alternative embodiment illustrated in FIGS. 19 and 20, the seat back 246 is designed to tilt forward as the seat assembly 242 is raised from a sitting to a standing position. The seat back 246 also tilts rearwardly as the seat assembly 242 is moved from a standing to a sitting position. In this manner, the operator is allowed to lean back slightly further when in a sitting position. It has been found that this is a more comfortable position and typically provides a seated operator with a greater sense of stability and balance, because the center of gravity of the operator's upper body is located slightly more rearwardly when sitting. Additionally, the operator achieves a more natural standing position when the seat assembly 242 is raised.

An embodiment of mechanism to allow the seat back 246 to tilt forward as the seat assembly 246 is raised to an upright position is illustrated in FIGS. 19 and 20. The following description and FIGS. 19–22 illustrate the right-hand side of the mechanism. It will be appreciated that analogous members are present on the left-hand side. The upper end of bracket **318*a* is pivotably connected to the lower portion of forward bracket 578 by pivot pin 576. The forward bracket 578 is rigidly secured to frame assembly side member 252. The lower end of bracket 318*a* is pivotably attached to the base frame 202. Seat side member 306*a* is pivotably connected to the upper portion of forward bracket 578 by upper forward pivot pin 258. Frame arm 302*a* is pivotably connected at its forward end to a central rear portion of the forward bracket 578 by lower forward pivot pin 458. The opposite end of frame arm 302*a* is pivotably connected to the lower seat back 246 by lower rear pivot pin 460. The seat back member 246 is pivotably connected to adjustable seat side member 560 by way of upper rear pivot pin 317**.

Figure 21:
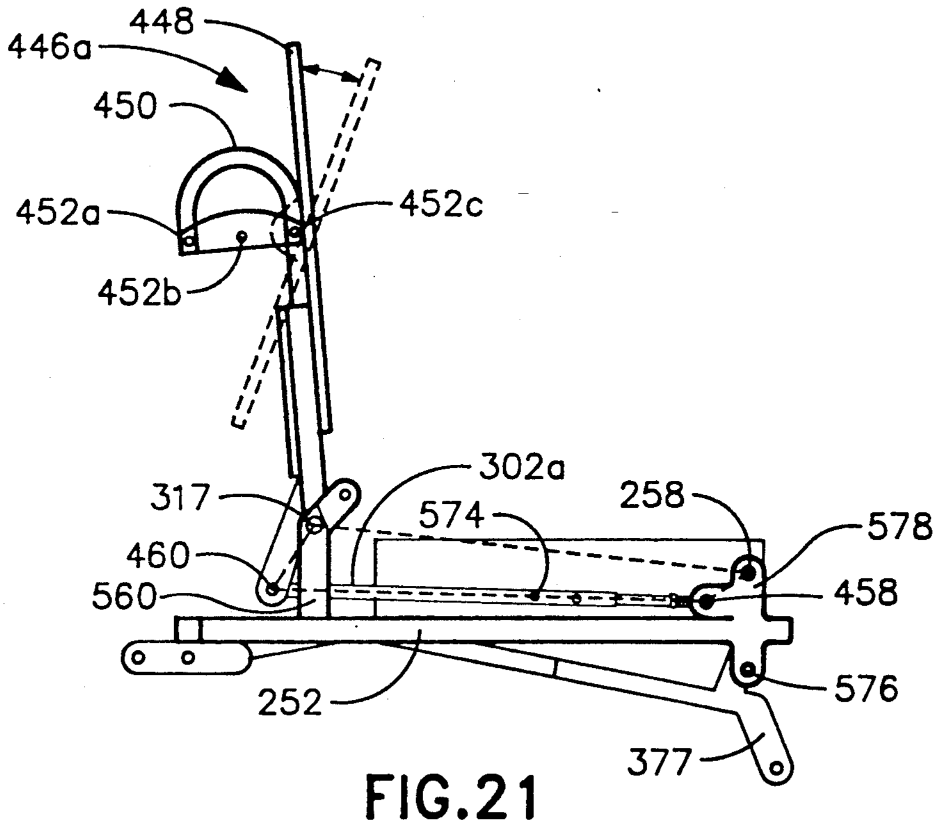
FIG. 21 is a side view of an embodiment of the linkages and pivot points employed in interconnecting the seat assembly and the back assembly.
Figure 22:
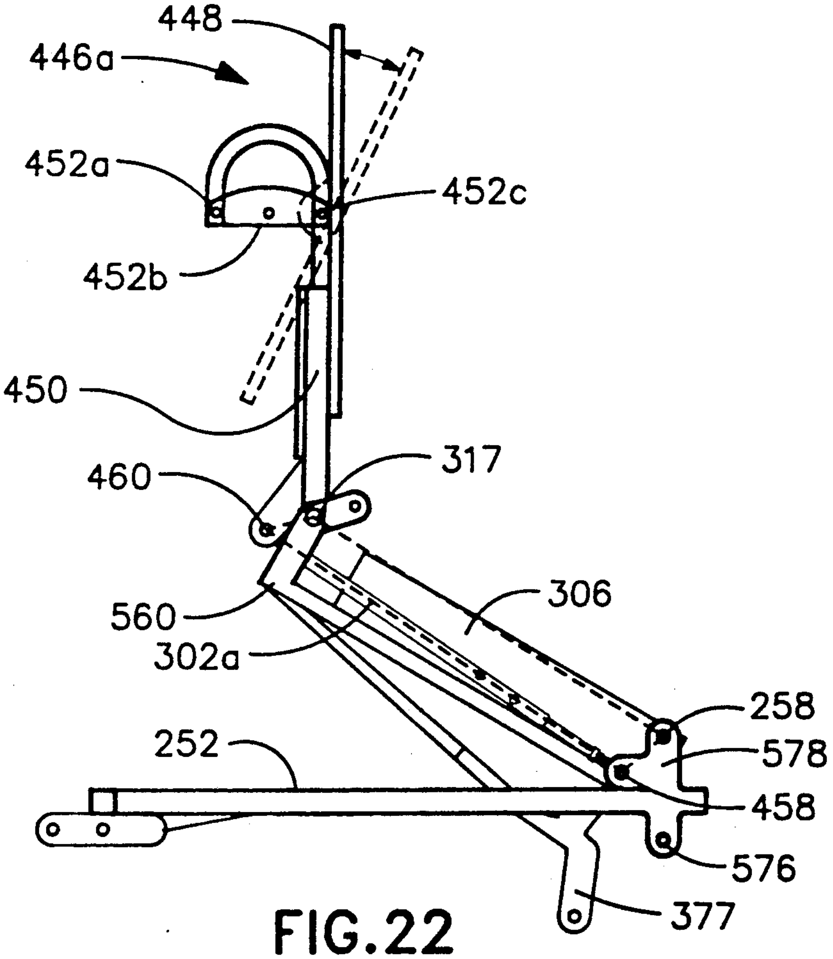
FIG. 22 is a side view of the linkages and pivot points shown in FIG. 21 with the seat in a partially upstanding position.

As illustrated in FIGS. 21 and 22, the dotted lines drawn between the four pivot pins 258, 458, 460, 317 do not form a true parallelogram. Preferably, the distance between pivot pins 458 and 258 is from about 2 to about 6 percent less than the distance between pivot pin 460 and pivot pin 317. In other words, the four sided figure shown by dotted lines in FIGS. 21 and 22 is not a true parallelogram, but rather a trapezoid with the forward short side being shorter than the rearward short side. The amount by which seat back member 246 tilts relative to seat member 244 as the seat assembly 242 is raised and lowered is proportional to the amount by which the trapezoidal figure connecting each pivot point 258, 458, 460, 317 diverges from a true parallelogram. If it is desired to have the seat back member 246 tilt rearwardly as the seat assembly 242 is raised to a standing position, this can be accomplished by designing the shape of the trapezoid so that the rear short side is shorter than the forward short side.

As illustrated in FIGS. 19 and 20, the seat back 246 tilts forwardly as the seat assembly 242 is raised to a standing position. In other words, angle al in FIG. 19 is greater than angle a2 in FIG. 20. However, the frame arm and bracket assemblies can be designed so that angle al in FIG. 19 is less than angle a2 in FIG. 20, i.e. so that the seat back 246 tilts rearwardly as the seat assembly 242 is raised to a standing position.

Figure 23:
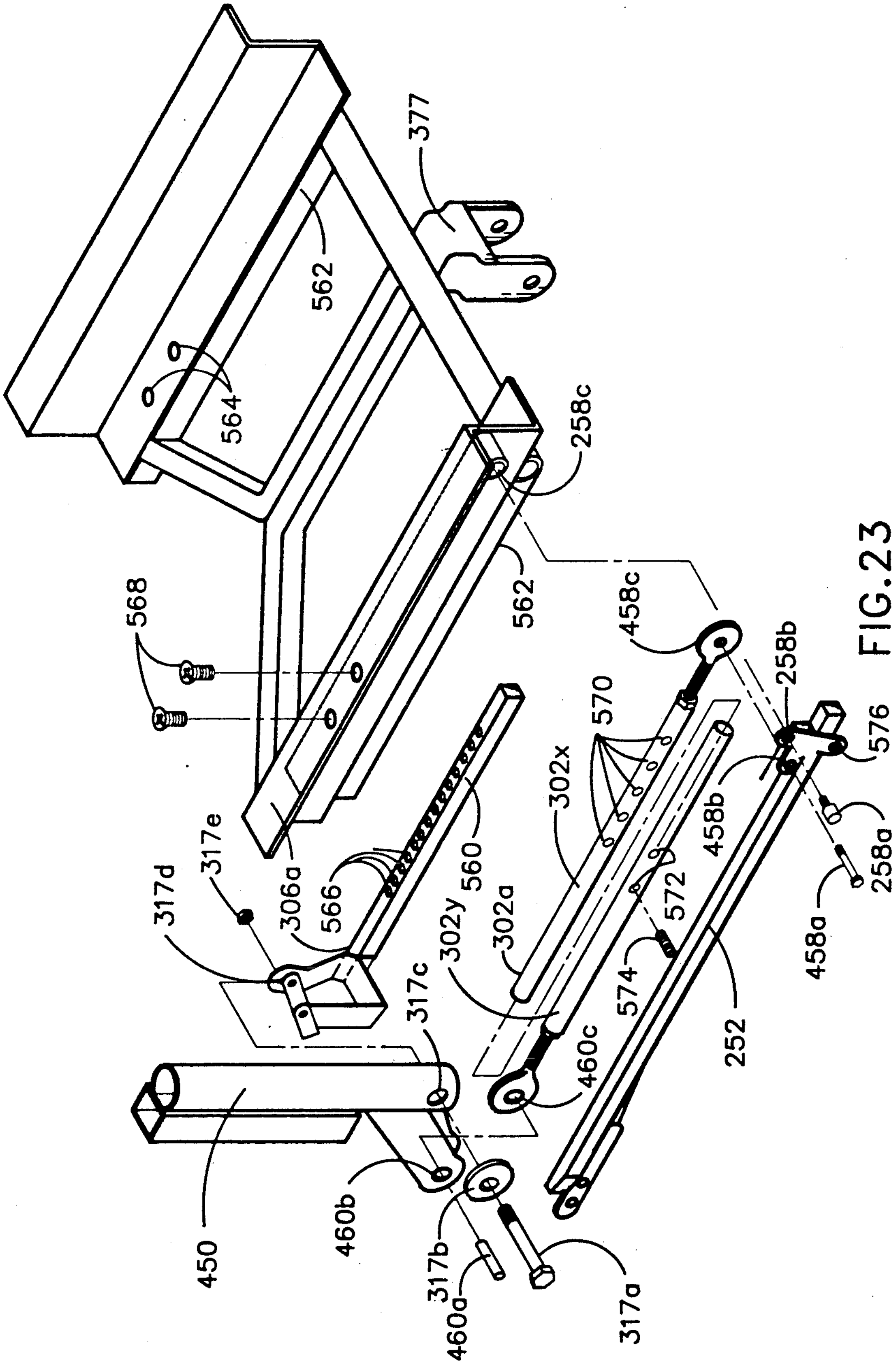
FIG. 23 is a perspective exploded view of the embodiment of the linkages and pivot points shown in FIG. 21.

The frame arm **302*a*, as shown in FIG. 23, can be adjustable in length. In this manner, it is possible to adjust the angular relationship between seat member 244 and back support 246. By increasing the length of the frame arm 302*a*, the angle between seat back 246 and seat member 244 will be decreased. Conversely, by decreasing the length of lower frame arm 302*a*, the angle between seat member 244 and seat back 246 will be increased. The lower frame arm 302*a* can be adjusted in length through the use of the mechanism illustrated in FIG. 23. The two ends of frame arm 302*a* are provided with female threaded portions. One end includes a left hand threaded portion and the other end includes a right hand threaded portion. The female threaded portions receive corresponding male threaded portions which are pivotly attached to pivot pins 458 and 460. When frame arm 302*a* is turned in one direction about its longitudinal axis, the action of the left and right hand threaded portions will result in a lengthening of frame arm 302*a*. Alternatively, when it is turned in an opposite direction the left and right handed threaded portions will bring about a shortening of frame arm 302*a***.

In addition to adjusting the length of the frame arm **302*a* for the purpose of adjusting the seat back 246 angle, the length of the frame arm 302*a* can be adjusted in order to accommodate operators having different leg lengths. It has been found that in order to prevent undue shear forces on the clothing of the operator, the length of the seat 244 should be adjusted to closely approximate the length of the operators upper leg from the knee to the hip. This adjustment is made by adjusting both the length of the frame arm 302*a* and the seat side member 306*a*. The length of frame arm 302*a* can be adjusted by first removing screw 574, as shown in FIG. 23. The frame arm 302*a* comprises an inner member 302*x* which slidably fits within an outer member 302*y*. The inner member 302*x* is provided with a plurality of holes 570, which can be aligned with one of holes 572 in the outer member 302*y*. By aligning different holes, the length of the frame arm 302*a* can be adjusted. When the desired length is achieved, screw 574 is screwed through both of the appropriate aligned holes 570 and 572**.

In a similar fashion, the length of the seat side member **306*a* can be adjusted by removing screws 568 and slidably moving the inner seat side bracket 560 within the outer seat side bracket 562 until the appropriate inner holes 566 line up with the two outer holes 564. When the desired length is achieved, the screws 568 are replaced in their respective outer holes 564 (not visible on right side, see analogous holes 564 on the left side of seat assembly 242) and the appropriate two inner holes 566. The seat back 246 angle can be fine tuned by twisting the frame arm 302***a* about its longitudinal axis either clockwise or counterclockwise, as appropriate. Although the foregoing description in connection with FIGS. 18-23 has been with respect to the right side of the wheelchair only, it will be appreciated that analogous members are provided on the left side of the chair to perform similar functions.

FIG. 23 illustrates the manner in which frame assembly side member 252, frame arm 302*a*, seat side member 306*a*, and back support frame member 450 can be pivotably interconnected. Frame arm 302*a* can be pivotably connected at one end to side frame member 252 by placing pivot pin 458*a* through pivot hole 458*b* in side frame member 252 and through pivot hole 458*c* in one end of frame arm 302*a*. The opposite end of frame arm 302*a* is pivotably connected to seat back frame member 450 by placing pivot pin 460*a* through pivot hole 460*b* in seat back frame member 450 and through pivot hole 460*c* in the end of frame arm 302*a*. The inner member 560 of seat side member 306*a* can be pivotably connected to the seat back frame member 450 by placing a bolt 317*a* through a washer 317*b*, through a hole 317*c* in seat back frame member 450, and through a hole 317*d* in inner seat side member 560. The bolt 317*a* is secured with nut 317*e*. The outer member 562 of seat side member 306*a* can be pivotably connected to frame assembly side member 252 by placing pivot pin 258*a* through pivot hole 258*b* in frame assembly side member 252 and then through pivot hole 258*c* in seat side member 306*a*. As will be appreciated, analogous connections are made between members (not shown) on the left side of the seat assembly 242.

As the seat assembly 246 is raised by the action of either piston 308 or 308*a*, depending upon the embodiment employed, the seat member 244 is raised toward the vertical position shown in FIG. 20 and the seat back 246 tilts forwardly. This provides a number of advantages. For example, the operator attains a more natural standing position by having the seat back tilt forwardly slightly. Also, the frame arm and bracket assembly shown in FIGS. 19 and 20 is much more compact than that shown in FIGS. 6 through 12. Additionally, the bracket and frame assembly shown in FIGS. 19 and 20 permits use of a horizontal seat raising piston 308*a*. Further, the number of pinch points in which an operator can be injured is reduced. Additionally, the adjustable frame arm 302*a* permits adjusting the angular relationship between seat 244 and seat back 246. Furthermore, the length of the seat 244 can be adjusted to suit the upper leg length of the operator.

An advantage of the frame arm and bracket assembly shown in FIGS. 19-23 over the prior art is that linkages in which an operator is likely to become pinched during the raising and lowering of the seat assembly 242 are kept below the seat side member 306*a*. This provides important safety advantages. However, while pivot pin 258 can be positioned relatively close to the operator's knee and while pivot pin 317 can be positioned relatively close to the operator's hip, they are not adjacent to the respective hip and knee joints. Due to the distance between the hip and knee and pivot points 317 and 258, some shear may occur when the operator moves between sitting and standing positions. To alleviate this problem, a number of features are provided in the present chair. For example, the frame assembly 250 can be raised and lowered simultaneously with the raising and lowering of the seat assembly, as described hereinbelow. Furthermore, an adjustable and tiltable seat back can be provided as described hereinafter.

An embodiment of an adjustable and tiltable seat back is shown in FIGS. 21 and 22. Seat back assembly 446*a* comprises a seat back pad 448 pivotably attached to seat back frame 450. The seat back pad 448 is adjustable by pivotable attachment at any one of a plurality of attachment points 452*a*, 452*b*, or 452*c*. Additionally, the seat back pad 448 is pivotable about a horizontal axis which passes through the relevant attachment points 452*a*, *b* or *c* in order to provide for the comfort of the operator.

One embodiment of the raising movement of the seat member 244 is particularly illustrated in FIGS. 10-12 wherein the piston 308 begins to raise the seat member 244 in FIG. 11 and completes its movement in FIG. 12 wherein the seat 244 is fully raised to approximately 60°-75° from the beginning horizontal position illustrated in FIG. 10. Such movement can also be accomplished by contracting piston 308*a* shown in FIGS. 18-20. An operator positioned within the apparatus 200 in which the seat member 244 has been raised is wedged slightly between the engagement of his knees against the gate mechanism 276, his buttocks against the seat 244 and his feet against and onto the foot rest 212. In this particular apparatus 200, however, the wedging action of the knees against the gate mechanism 276 is not as great as in the embodiment illustrated in FIGS. 1-5. Thus, significantly more weight is placed upon the feet of the operator and onto the foot rest 212, with much of the weight of the operator being taken off the buttocks and shifted to the legs and feet to aid in circulation as well as significant weight shifting, which matters are previously described. Moreover, when the device 200 is sized so that the operator can be a child, such weight shifting to a child's legs and feet is extremely important to assist in proper growth of the child's legs. Without such weight loading, a child's leg growth tends to be stunted.

In preferred form, the side brackets 306 which contain the cushion of the seat member 244 include flange 323 having a pair of apertures 324, 326 which are adapted to receive the ends of handles 328. The handles 328 are sized and shaped to fit snugly into the apertures 324, 326. It should be noted, however, that the handles 328 are designed to be readily removed to enable an operator to simply slide sideways from the side of seat 244 onto another chair or piece of furniture instead of having to move outwardly through the entryway defined by the gate mechanism 276. In addition, the gate mechanism 276, as previously discussed, is removable from the first frame assembly 250 to also permit such easy sliding movement onto or off of the wheelchair/-walker apparatus 200.

In preferred form, the device 200 is power driven. In this instance, the operation of the pistons 266 or 266*a* and 308 or 308*a* are powered by the power mechanism, preferably rechargeable batteries, contained within the housing unit 210. The employment of piston 308*a* shown in FIGS. 18-20 permits the use of larger batteries, hence longer periods between recharging. Moreover, the operation of the pistons 266 or 266*a* and 308 or 308*a*, as well as the drive wheels 234, 236 are controlled by the control lever mechanisms 342, 348 mounted on a pair of removable arm members 330, 332. Each arm member 330, 332 preferably includes a pin 334 which is extendable within a bracket 336 mounted on the rear of the back support 246. The pin 334 engaging within the aperture 338 of the bracket 336 allows the arm members 330, 332 to be pivoted upwardly to permit an operator to slide on and off the seat 244. Stop members 340 are also disposed on the rear ends of the arms 330, 332 to insure that the arms 330, 332 will remain substantially horizontal in their downward position as illustrated in FIG. 6 by engagement with the rear portion of the back support member 246. Optionally, as illustrated in FIGS. 19 and 20, an arm support 480 can be employed under each arm 330, 332. The arm support 480 comprises two slidably engagable sections 482 and 484 which permit the arm to be maintained in a substantially horizontal position during the raising of the seat as well as permit the arms to be lifted out of the way when it is desired to transfer out of the apparatus 200.

Disposed at the distal ends of the arms 330, 332 are the controls for use by the operator in moving the apparatus 200 about a ground surface by controlling the drive wheels 234, 236 as well as controlling the operation of the seat assembly 242. These controls can be of any desired and selected arrangement and can also include chin contact controls as well as sip and puff controls typically utilized in power wheelchair devices by quadriplegics. In the illustrated embodiment, the control member 342 is disposed at the distal end of the arm 330 and includes a toggle control 344 for operating and engaging the drive wheels 234, 236 as well as speed switches 346. Extension and contraction of the pistons 266 or **266*a* and 308 or 308*a* is controlled by a second control device 348 which is preferably disposed on the distal end of the arm 332. Thus, the operation of the drive wheels 234, 236 and thus the movement of the apparatus 200 over a ground surface is controlled independent from the raising and lowering of the seat assembly 242 and, in the illustrated embodiment, can be performed simultaneously with raising or lowering of the operator from a fully seated position as illustrated in FIGS. 9 and 10 to a fully upright position as illustrated in FIG. 6 and 12**.

In a preferred embodiment, movement of the piston 266 or **266*a* and thereby movement of the frame assembly 250 from its lower horizontal position illustrated in FIG. 9 to its upper rearward horizontal position illustrated in FIG. 10 can occur simultaneously with operation of the piston 308*a*. Thus, in the preferred form, the operator of the apparatus 200 can select the most comfortable vertical level of the seat 244 in its horizontal position depending upon the length of the operator's legs. Simultaneously, the operator can readily raise or lower the seat 244 from a fully seated position to a fully upright position or any position therebetween as desired. This raising and lowering can be done simultaneously with operating the drive wheels 234, 236, thus allowing the operator to move up and down while simultaneously moving the apparatus 200 about a ground surface. In addition, a chest belt 350 is provided for use by the operator if desired. In addition, the preferred embodiment includes curved trays or other similar arrests 352, 354 which may be mounted along the upper surface of the arms 330, 332** to provide comfort for the operator.

Figure 8:
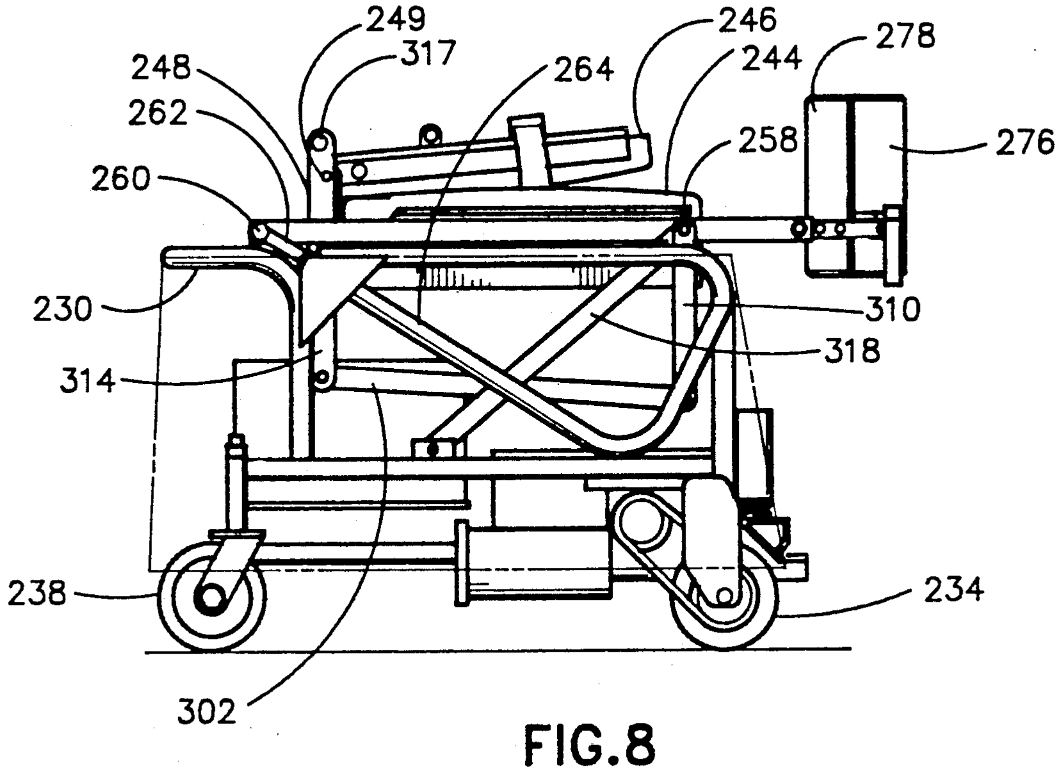
FIG. 8 is a side view of the embodiment of FIG. 6 with the device in a fully seated position and the seat back in a folded condition for transportation.

As illustrated in FIG. 8, the seat back member 246 may be folded down upon the seat 244 to permit collapse of the apparatus 200 for transportation. To achieve this movement, the pin members 317 which engage the upper ends of the second vertically oriented connector rods 314, 316 with the seat back member 246 are removed from engagement with the seat back 246 thereby allowing the seat back 246 to be pivotably folded along the pivot connection 249 with the brackets 248. In this preferred form, the apparatus 200 may be folded to a total height of 24" while having a depth ranging between 21–24". Moreover, the seat height of the seat member 244 above the ground surface may range from 20–24" depending upon movement and positioning of the piston 266. This permits the apparatus 200 to be readily adjusted for a wide range of operator heights.

Figure 15:
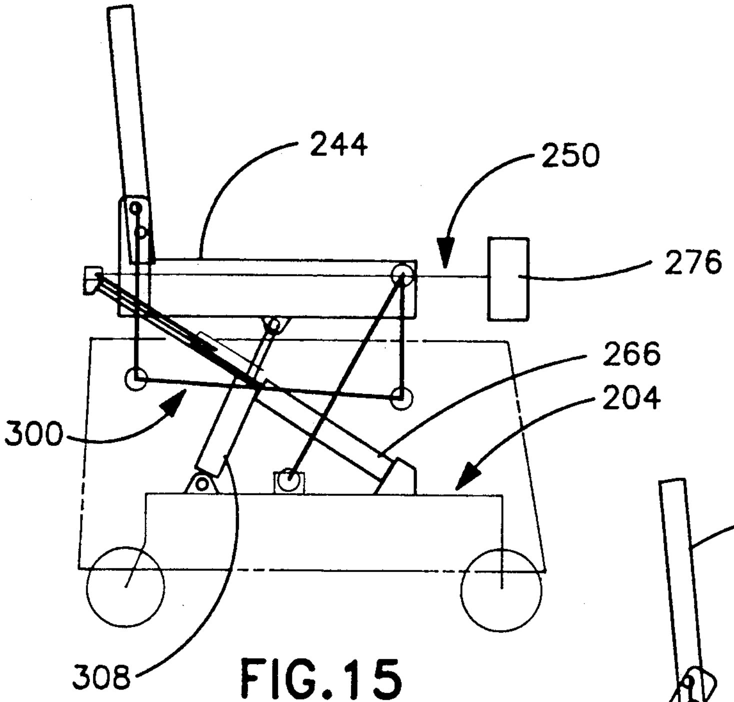
FIG. 15 is a side schematic similar to that of FIG. 10 illustrating the seat operating components thereof.
Figure 16:
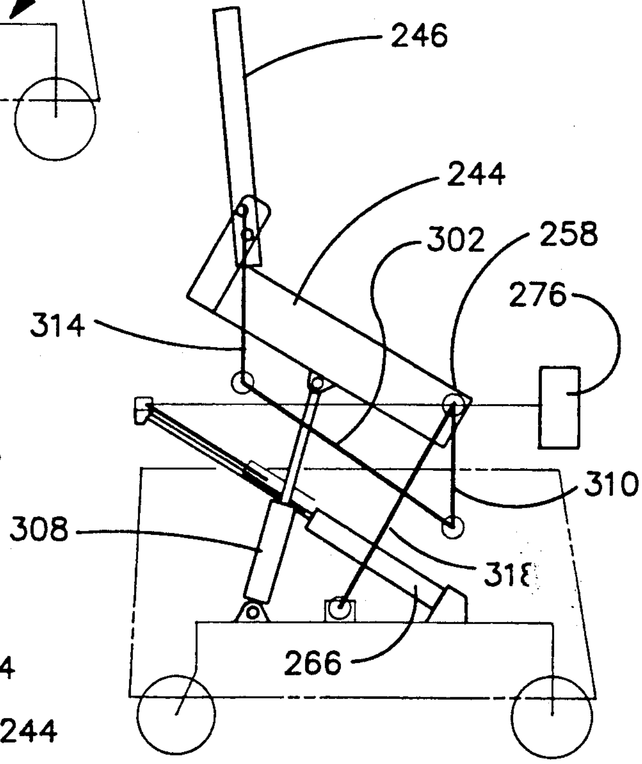
FIG. 16 is a side schematic similar to that of FIG. 11 illustrating the seat operating components thereof.
Figure 17:
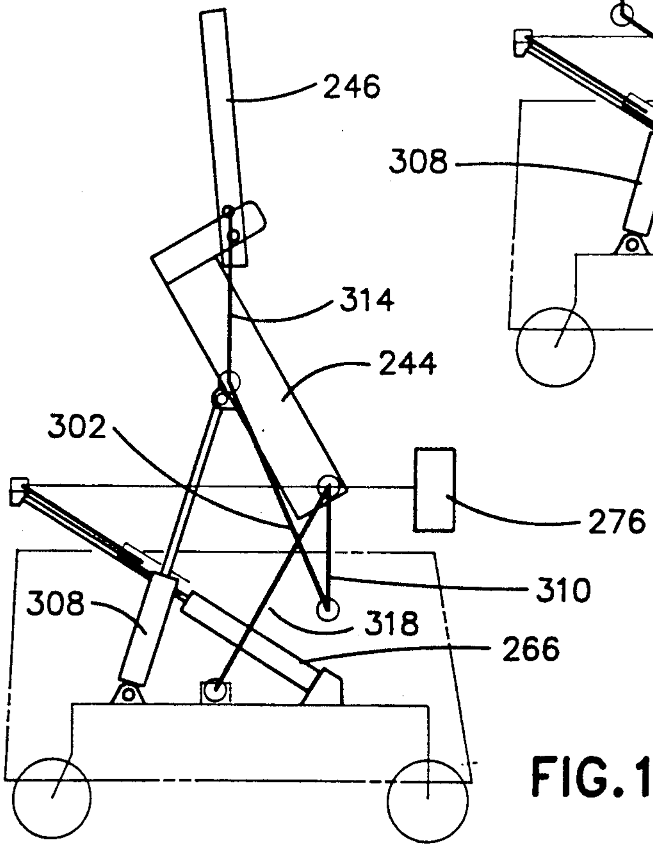
FIG. 17 is a side schematic similar to that of FIG. 12 illustrating the seat operating components thereof.

Referring now to FIGS. 13–17, the schematics illustrated therein more clearly illustrate the operation of the various components of one embodiment of the apparatus 200. As can be seen from FIG. 13, the seat back member 246 may be folded down on top of the seat 244 by pivoting along pivot pin 249 in bracket 248. FIG. 14 illustrates the apparatus 200 with the seat back member 246 in its fully upright position and the frame assembly 250 in its lowermost horizontal position. In order to raise the frame assembly 250 to its uppermost horizontal position as illustrated in FIG. 15, the first piston 266 must be activated to extend the same. When this occurs, the entire first and second frame assemblies 250 and 300 are raised relative to the base portion 204. In addition, the seat 244 is moved rearwardly relative to the base portion 204 due to the interaction of the rods 262 within the tube 264 which run parallel with the piston 266. Since the gate mechanism 276 moves vertically and rearwardly with the first frame assembly 250, the actual height of the gate mechanism 276 may not be as great as the embodiment illustrated in FIGS. 1–5 since the position of the end of the seat 244 relative to the gate mechanism 276 does not change with raising or lowering of the frame assembly 250 between its first and second horizontal positions.

When it is desired to stand the operator into an upright position, the second piston 308 is engaged and extended to raise the rearmost end of the seat 244 and pivot the seat 244 about the pivot pin 258. As can be seen from FIGS. 16 and 17, the first and second vertically oriented connector rods 310 and 314 remain substantially vertically oriented so as to maintain the same relative position between the seat back portion 246 and the base 204. Thus, the back of the operator will be continuously supported by the backrest member 246 while the weight of the operator will be shifted from the seat 244 to primarily the feet of the operator with some weight being carried through a wedging relationship between the operator's knees against the gate mechanism 276 and the buttocks against the seat 244. Alternatively, if the piston **308*a*, as shown in FIGS. 18–20 is employed, the seat assembly 244 will be raised by contracting piston 308*a*. Additionally, if the back support shown in FIGS. 19–23 is employed, the back support assembly 246 will tilt forwardly as the seat member 244** is raised toward the vertical position.

As can also be clearly seen, while the operator will be firmly maintained within the apparatus 200 in an upright position by the triangular relationship between the foot support 212, the gate mechanism 276 and the seat 244, there is very little in the way of machine disposed about the upper torso portion of the operator. Thus, the psychological effect is that the operator will have even less connection with the apparatus 200 as with the walker described in FIGS. 1-5. Nonetheless, even though there is very little in the way of visible support to the upper torso of the operator, the operator is nonetheless firmly secured within the apparatus 200, for approximately 80% of the weight will be transferred to the front drive wheels 234, 236 thereby providing significant control over the apparatus 200 in the upright position.

As can be seen from the above, the present invention provides a wheelchair/walker combination apparatus which permits an operator to easily move into and out of the device without additional assistance. Moreover, the powered device enables an operator with absolutely no leg muscle use or control to move between a fully seated and a fully upright position thereby permitting the operator to change relative weight distribution between his feet, knees, thighs and hips without assistance. This ability to change and shift weight distribution is both physically and psychologically beneficial to the operator and will enable the operator to remain within the motorized wheelchair/walker for extended periods of time. The device of the present invention enables the operator to move the device with good maneuverability in tight operating conditions as well as over uneven ground surface without loosing traction or stability thereof from either a fully seated position or from a fully upright position. Thus, the present invention has the capability of functioning fully as a wheelchair as well as a powered walker.

It will be understood that while illustrative and presently preferred embodiments of the invention have been described in detail herein, the inventive concepts may be otherwise variously embodied and employed and that the appended claims are intended to be construed to include such variations except insofar as limited by the prior art.

What is claimed is:

1. An apparatus comprising:

a) a frame assembly defining a central space for containing an operator;

b) means attached to said frame assembly for support said frame assembly, said means for supporting including means attached thereto for selectively moving said apparatus over a ground surface;

c) a seat assembly attached to said supporting means, said seat assembly having a seat member;

d) means connecting said supporting means and said seat member, for shifting said seat member between a first horizontal position and a second horizontal position, said first horizontal position being defined within said central space, and said second horizontal position projecting forwardly outwardly of said frame assembly to permit said operator access to said seat member from the exterior of said apparatus; and e) means for repositioning said seat member between a substantially horizontal sitting position and a substantially vertical standing position.

2. The apparatus as claimed in claim 1, wherein said moving means comprises at least one powered wheel for moving said apparatus over said ground surface, and wherein said powered wheel is powered for rotational movement and said moving means further includes means attached to said powered wheel to maintain said powered wheel in contact with said ground surface when said apparatus is moved over uneven terrain.

3. The apparatus as claimed in claim 1, wherein said frame assembly comprise side portions to define a space therebetween for receiving said operator and to define a front entryway to permit ingress to and egress from said space by said operator; and further comprising gate means attached to at least one of said side portions for selectively extending across said entryway to provide a closure mechanism when said operator is in said apparatus.

4. The apparatus as claimed in claim 1, wherein said seat assembly means includes a drive means in operable communication with said shifting means to move said seat member between said horizontal positions.

5. In an apparatus comprising:

a) a frame assembly defining a central space for containing an operator in a standing position;

b) means attached to said frame assembly for supporting said frame assembly; and c) seat assembly means engaged with said supporting means having a seat member moveable between a substantially horizontal position within said central space wherein said operator is maintained in a sitting position and a substantially vertical position wherein said operator is maintained in said standing position within such central space;

an improvement comprising seat control means connected to said seat member for moving said seat member between a first horizontal position disposed substantially within said central space and a second horizontal position which projects forwardly outwardly of said frame assembly.

6. The apparatus as claimed in claim 5, wherein said seat control means includes control motor means.

7. The apparatus, as claimed in claim 5, further comprising:

d) gate means attached to said frame assembly for closing an entryway into said central space;

wherein said substantially vertical seat position is aligned approximately 10 degrees from a vertical axis perpendicular to a plane defined by said supporting means, said seat member being arranged to permit leverage of said operator's buttocks against said seat member in conjunction with leverage of said operator's knees against said gate means to maintain a wedging position within said apparatus without requiring any support and control from the legs of said operator.

8. A wheelchair apparatus comprising:

a) seat means for supporting an operator in a seated position;

b) means attached to said seat means for moving said seat means between a seated position and a substantially vertical position wherein said operator is in a substantially vertical standing position;

c) frame assembly means attached to said seat means for supporting said seat means;

d) vertical movement means attached to said frame means for moving said frame assembly means between a lower position and an upper position which is vertically upwardly disposed relative to said lower position; and e) horizontal movement means attached to said seat means for moving said seat means between a forward position and a rearward position which is horizontally rearwardly disposed relatively to said forward position.

9. The apparatus as claimed in claim 8, wherein:

a) said vertical movement means permits movement of said frame assembly means between said upper and lower positions independent from said movement of said seat means between said forward and rearward positions; and b) said horizontal movement means permits movement of said seat means between said forward and rearward positions independent from said movement of said frame assembly means between said upper and lower positions.

10. The apparatus as claimed in claim 8, wherein said vertical movement means moves said frame assembly means in an upward and simultaneously rearward direction and moves said frame assembly means in a downward and simultaneously forward direction.

11. The apparatus as claimed in claim 8, further comprising:

e) frame means having a base portion; and f) seat movement means for moving said seat means between a sitting position and a standing position;

wherein said vertical movement means comprises a first piston connecting said base portion and said frame assembly capable of expansion and contraction in a longitudinal direction and said seat movement means comprises a second piston connecting said base portion and said seat means capable of expansion and contraction in a longitudinal direction.

12. The apparatus as claimed in claim 11, wherein a first end of said first piston is pivotably attached to said base portion and a second end of said first piston is pivotably attached to said frame assembly means.

13. The apparatus as claimed in claim 11, wherein a first end of said second piston is pivotably attached to said base portion and a second end of said second piston is pivotably attached to said seat means.

14. A method for receiving an operator and moving the operator into a standing position in a wheelchair apparatus having a seat means comprising the steps of:

a) moving said seat means in a horizontally forward direction in order to permit an operator to transfer onto or off from said seat means;

b) moving said seat means in a horizontally rearward direction in order to position said operation within said apparatus; and c) selectively moving said seat means between a substantially horizontal sitting and a substantially vertical standing position.

15. A method as claimed in claim 14 further comprising the step of moving said seat means horizontally by expanding and contracting a piston.

16. A method for adjusting a wheelchair apparatus having a seat means to the size of an operator, comprising the steps of:

a) providing a seat means for supporting said operator;

b) providing a frame assembly means for movably supporting said seat means;

c) moving said frame assembly means in either an upward or downward direction in order to adjust for the length of the operator's legs by varying the distance between said seat means and a footrest upon which the operator's feet are placed; and d) selectively moving said seat means from a substantially horizontal sitting position to a substantially vertical standing position.

17. The method as claimed in claim 16 further comprising the step of simultaneously moving said frame assembly means upwardly and rearwardly.

18. The method of claim 16 further comprising the step of moving said frame assembly means upwardly by expanding a piston.

* * * * *

UNITED STATES PATENT AND TRADEMARK OFFICE
CERTIFICATE OF CORRECTION

PATENT NO. : 5,137,102
DATED : August 11, 1992
INVENTOR(S) : HOUSTON et al.

It is certified that error appears in the above-identified patent and that said Letters Patent is hereby corrected as shown below:

Column 20, lines 18 and 21, delete "al" and insert --a1-- therefor;

Col. 25, line 43, delete "support" and insert --supporting-- therefor;

Col. 26, line 2, delete "comprise" and insert --comprises-- therefor;

Col. 26, line 66, delete the word "relatively" and insert --relative-- therefor.

Signed and Sealed this

Twenty-sixth Day of October, 1993

Attest:

BRUCE LEHMAN

*Attesting Officer*

*Commissioner of Patents and Trademarks*